United States Patent
Natanzon et al.

(10) Patent No.: US 10,191,755 B1
(45) Date of Patent: *Jan. 29, 2019

(54) VIRTUAL REPLICATION

(75) Inventors: Assaf Natanzon, Tel Aviv (IL); Saar Cohen, Moshav Mishmeret (IL); Jehuda Shemer, Kfar Saba (IL); Alex Solan, Hertzliya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 1142 days.

This patent is subject to a terminal disclaimer.

(21) Appl. No.: 13/534,042

(22) Filed: Jun. 27, 2012

(51) Int. Cl.
*G06F 17/30* (2006.01)
*G06F 9/455* (2018.01)

(52) U.S. Cl.
CPC ...... *G06F 9/45558* (2013.01); *G06F 9/45533* (2013.01); *G06F 17/30203* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,010,780 B2 * | 3/2006 | Perycz | H04L 67/34 717/107 |
| 2011/0161295 A1 * | 6/2011 | Ngo | 707/639 |
| 2012/0151273 A1 * | 6/2012 | Ben Or et al. | 709/217 |

* cited by examiner

*Primary Examiner* — Jau Shya Meng
(74) *Attorney, Agent, or Firm* — Krishnendu Gupta; Deepika Bhayana

(57) ABSTRACT

A method, system, and computer program product for replication comprising exposing, via a virtualization layer, a storage entity; wherein the virtualization layer runs on a virtual machine and wherein the storage entity corresponds to a virtual disk, and splitting IO in a splitter, wherein the splitter runs in the virtualization layer and the splitting creates a copy of the IO sent to the virtual disk.

22 Claims, 56 Drawing Sheets

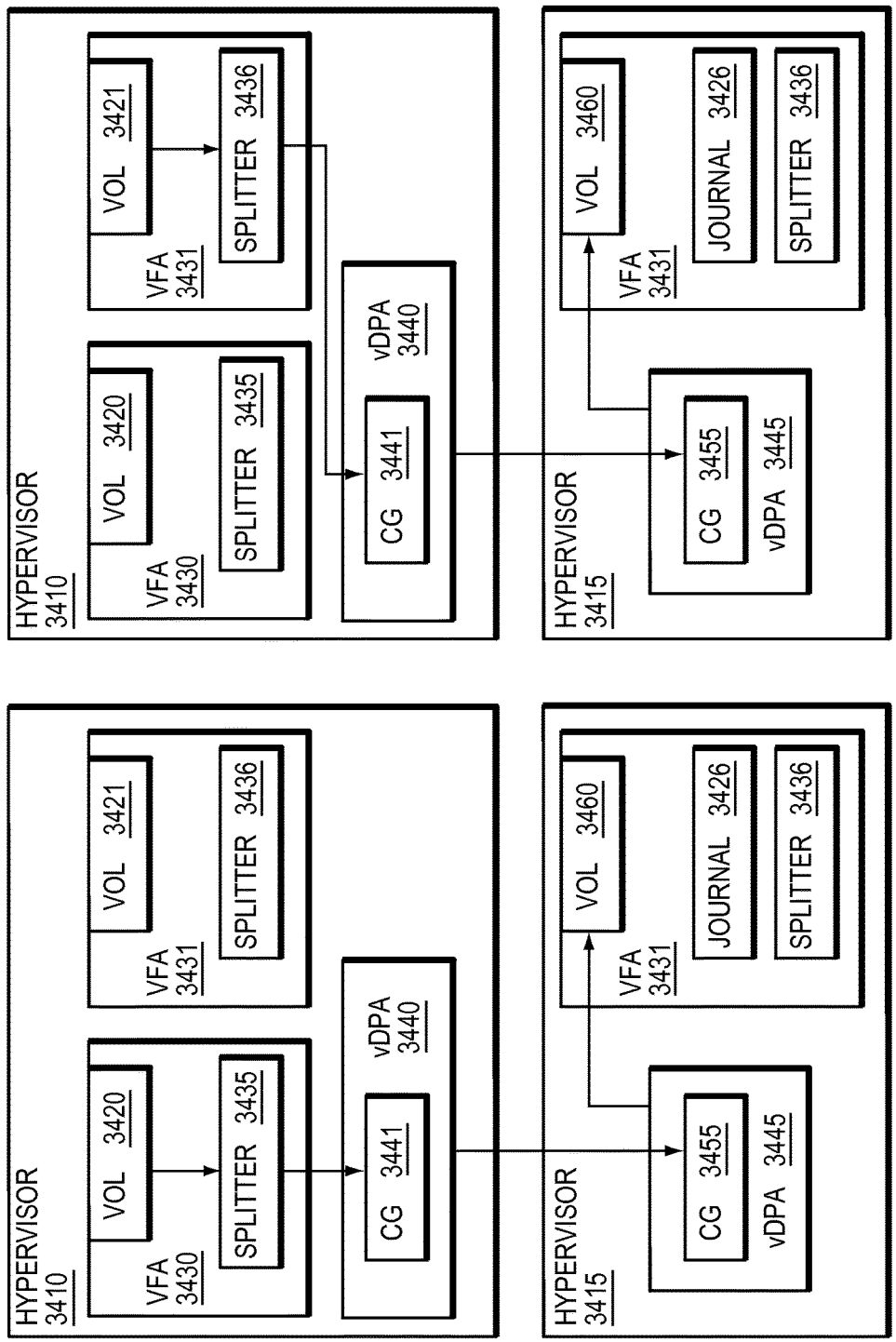

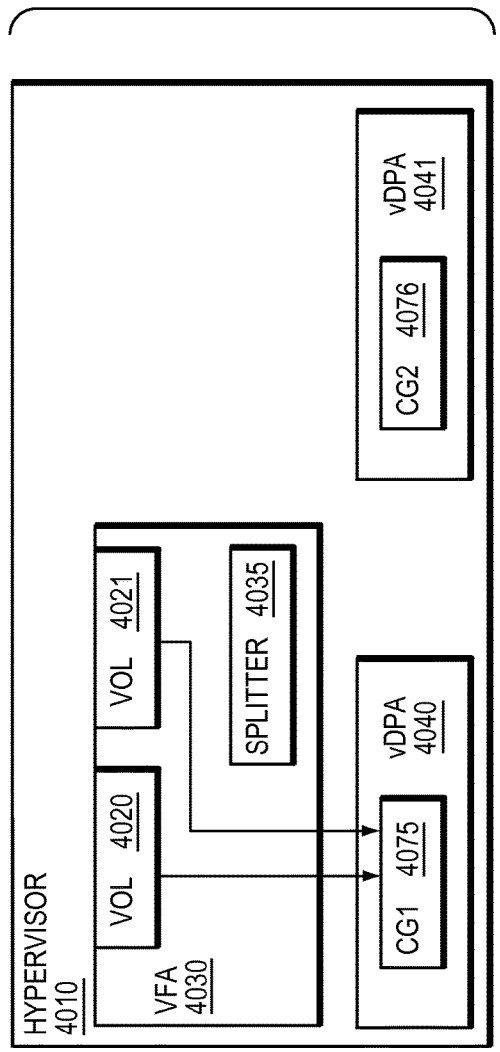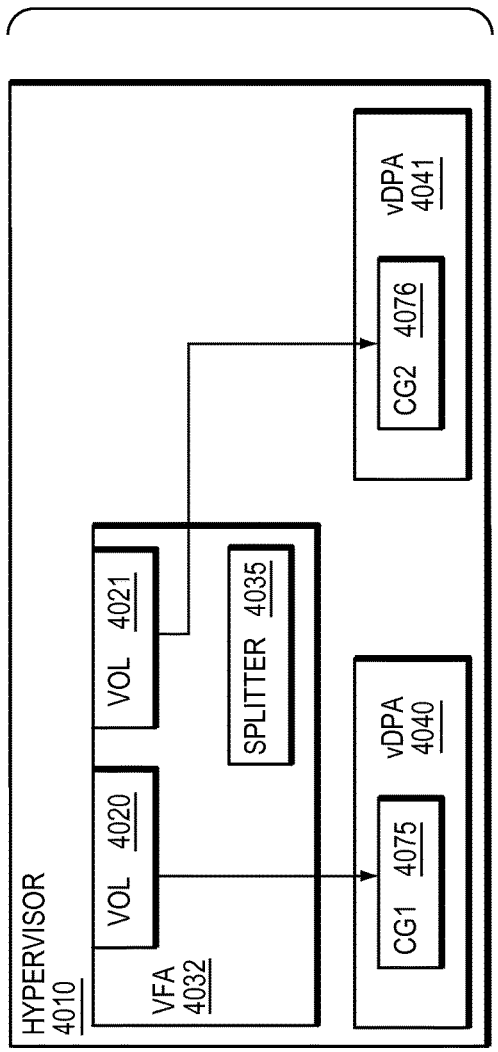

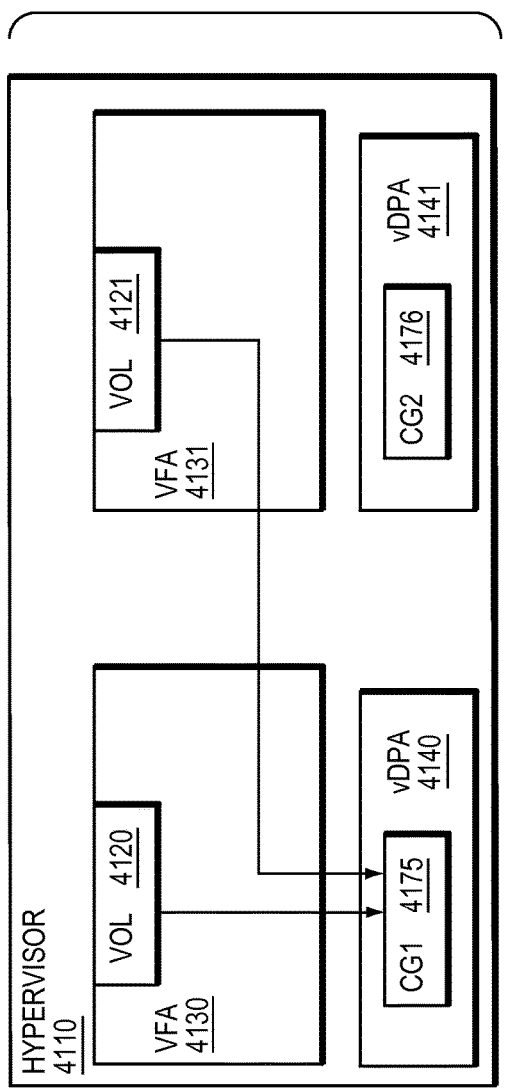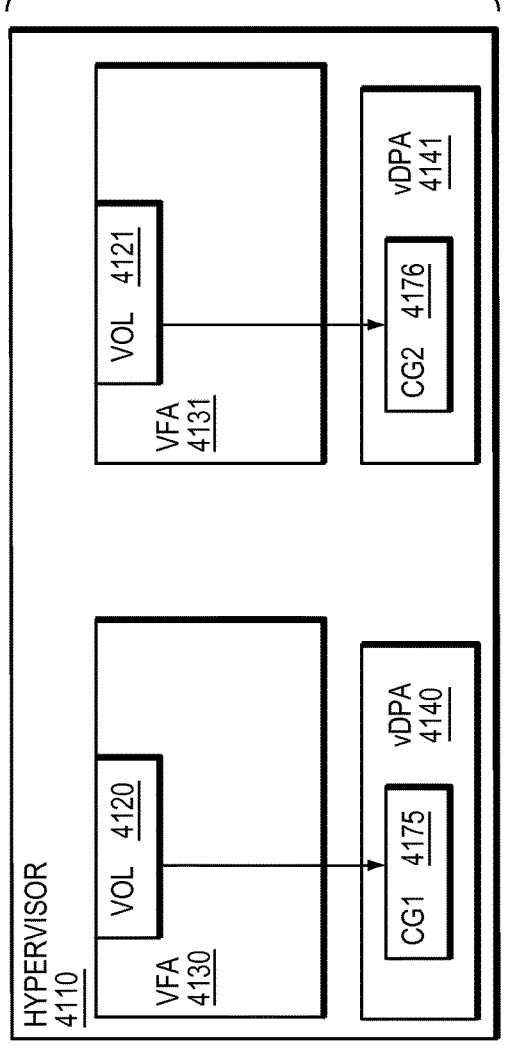

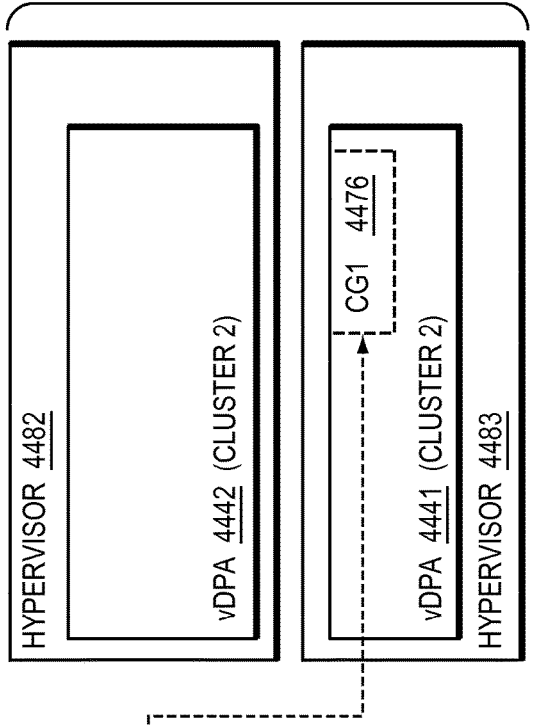
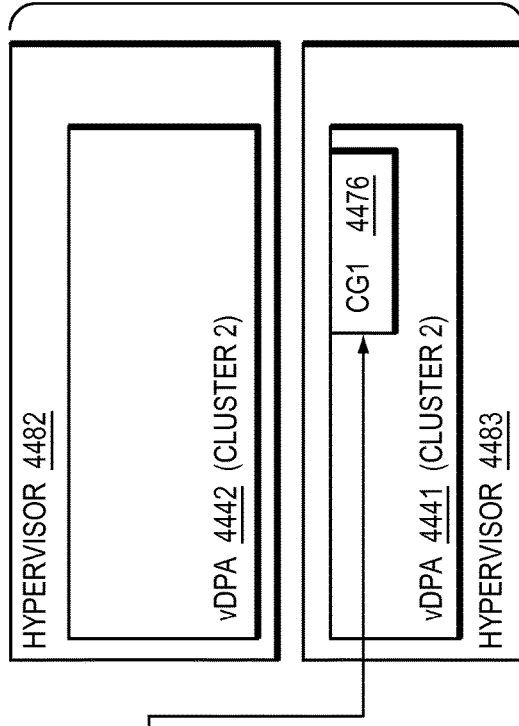
FIG. 44A
FIG. 44B

VIRTUAL REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and computer program product for replication comprising exposing, via a virtualization layer, a storage entity; wherein the virtualization layer runs on a virtual machine and wherein the storage entity corresponds to a virtual disk, and splitting IO in a splitter, wherein the splitter runs in the virtualization layer and the splitting creates a copy of the IO sent to the virtual disk.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 34a is a simplified illustration a replication system before storage motion, in accordance with an embodiment of the present disclosure;

FIG. 34b is a simplified illustration a replication system after storage motion, in accordance with an embodiment of the present disclosure;

FIG. 40a is a simplified illustration of two volumes being replicated to the same consistency group, in accordance with an embodiment of the present disclosure;

FIG. 40b is a simplified illustration one of the volumes of FIG. 40a being moved to be replicated by a different consistency group, in accordance with an embodiment of the present disclosure;

FIG. 41a is an alternative simplified illustration of two volumes being replicated to the same consistency group, in accordance with an embodiment of the present disclosure;

FIG. 41b is an alternative simplified illustration one of the volumes of FIG. 40a being moved to be replicated by a different consistency group, in accordance with an embodiment of the present disclosure;

FIG. 44a is a simplified illustration of two volumes being replicated by a first data protection appliance of a first consistency group, in accordance with an embodiment of the present disclosure;

FIG. 44b is a simplified illustration of moving a volume from being replicated by a first data protection appliance of a first consistency group to a second data protection appliance of the first consistency group, in accordance with an embodiment of the present disclosure;

DETAILED DESCRIPTION

Figure 1:
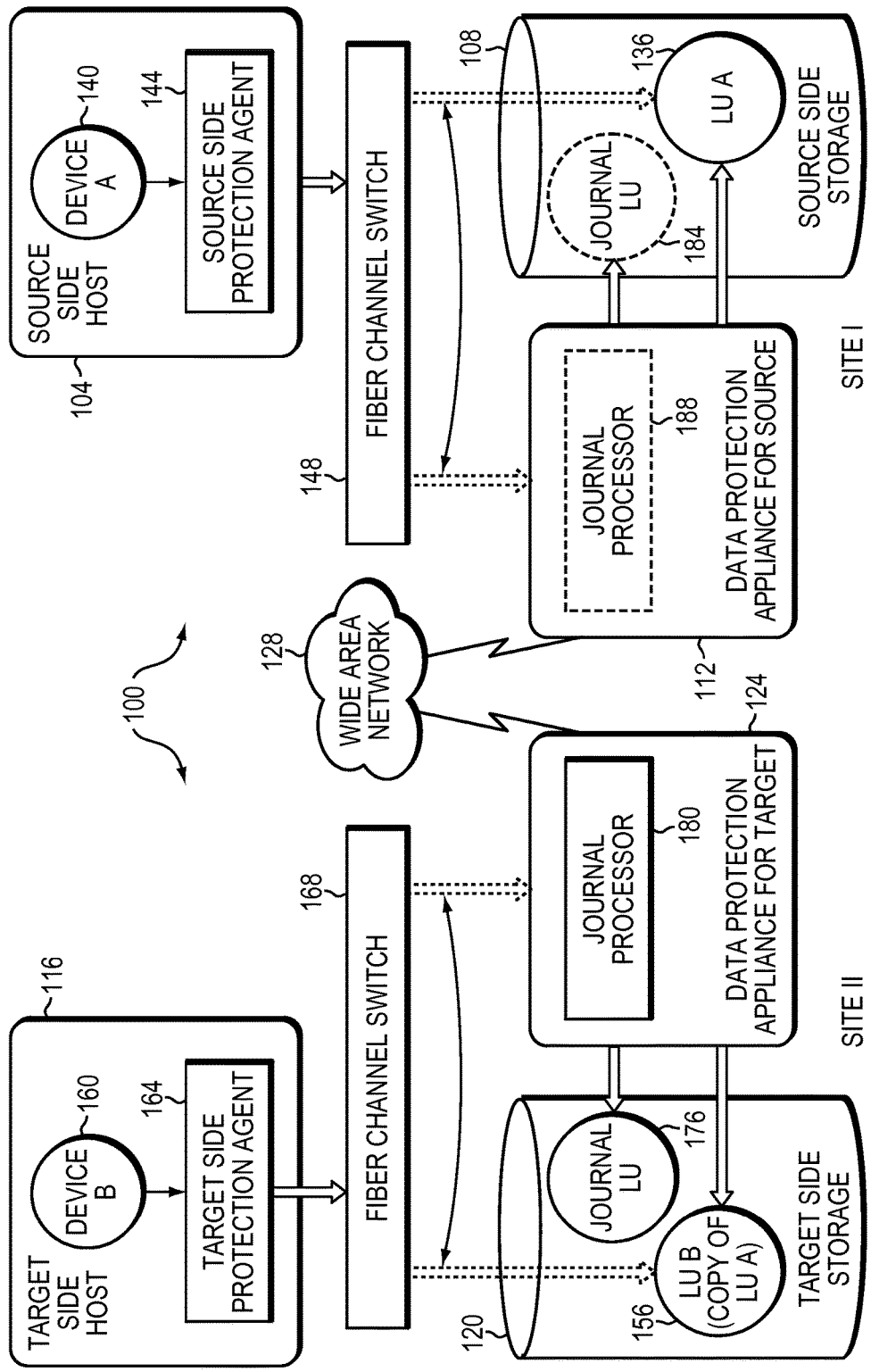
FIG. 1 is a simplified illustration of a data protection system, in accordance with an embodiment of the present disclosure.

In certain embodiments, it may be beneficial to replicate a virtual machine and the storage associated with a virtual machine. Typically, virtual replication may present complexity as there may not have been a way to access the IO for the virtual machine. In an embodiment of the current disclosure, a splitter may run in a virtualization layer in a virtual machine. In certain embodiments, a replication appliance may run in the same virtual machine as the virtual machine being replicated. In other embodiments, a replication appliance may run in another virtual machine, which may run on the same physical machine or on another physical machine. In some embodiments, a virtual splitter may run in a first virtual machine and a replication device or virtual replication device may run in a different virtual machine.

In certain embodiments, the current disclosure may enable replication in a virtual environment. In some embodiments, replication may be enabled a virtual machine level. In most embodiments, the virtual machine may operate in a hypervisor. In at least one embodiment, the hypervisor may be a VMware hypervisor or ESX. In further embodiments, the hypervisor may be a Microsoft or Citrix hypervisor. In at least one embodiment, there may be a virtualization layer in the hypervisor. In certain embodiments, the virtualization layer may split IOs from a virtual machine to a data protection appliance (DPA). In some embodiments, the DPA may be located in the same hypervisor as the virtual machine. In other embodiments, the DPA may be located in a different hypervisor than the virtual machine.

In some embodiments, a virtual machine may be replicated using a virtualization layer. In certain embodiments, the virtualization layer may be a virtual machine consuming volumes/file systems and exposing a different set of volumes. In some embodiments, the virtualization layer may expose a virtual machines volume (VVOL). In at least some embodiments, a VVOL may be consumed by virtual machine as a disk. In at least one embodiment, a virtualization layer may expose a file based protocol. In certain embodiments, the virtual machine may consume a file as a virtual disk.

In an embodiment, there may be a filter driver inside the virtualization layer. In certain embodiments, the filter driver may intercept the VM's IOs and may split the IO or redirect the IOs to provide replication. In some embodiments, the virtualization layer may allow access to the exposed volumes from only the Virtual Machine server, such as an ESX server, on which the virtualization layer may be running. In alternative embodiments, a different type of VM server may expose proprietary disk protocol or ISCSI.

In some embodiments, a virtual splitter may run in a VM to intercept and send the IOs to a replication appliance. In an embodiment, the replication appliance may run inside the virtualization layer. In another embodiment, the replication appliance may run in a virtual appliance running on the same hypervisor such as an ESX. In a further embodiment, the replication appliance may run on a separate hypervisor or ESX. In an alternative embodiment, the replication appliance may run on a physical appliance.

In certain embodiments, a virtual splitter may communicate to a virtual appliance over ISCSI. In another embodiment, a virtual splitter may communicate to a virtual appliance using SCSI protocol over other medium like Fiber Channel, or (Fiber Channel over Ethernet (FCOE). In still other embodiments, a virtual splitter may communicate to a virtual appliance using another protocol. In some embodiments, a virtual appliance may send IOs to a remote virtual appliance, which may write the data to a remote copy of the volume and to a journal. In certain embodiments, the journal may contain a redo log and undo log to allow point in time recovery.

In some embodiments, a virtual splitter may provide copy on write access to a point in time (TSP mode) by reading undo data from the backend volume writing it to a DPA or vDPA and writing the data to the disk. In other embodiments, a virtual splitter may provide virtual access by redirecting IOs to a DPA or vDPA. In further embodiments, a virtual splitter may use a read before write protocol.

In an embodiment, a virtual appliance may run on a first virtual machine and a virtualization lay may run on a different virtual machine and may not provide access to the volume splitter. In some embodiments, a volume splitter may provide access to the virtual appliance by creating a poll based protocol over ISCSI or another protocol.

The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

IOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

may be a virtual or physical site

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines.

VIRTUAL VOLUME: may be a volume which is exposed to host by a virtualization layer, the virtual volume may be spanned across more than one site and or volumes VASA: may be a set of vCenter providers that allow an administrator to manage storage Virtualization filter appliance (VFA): may be a layer in the hypervisor that has the ability intercepts and split IO from a VM being written to a virtual disk. In some embodiments, the VFA may be running on a VM in a hypervisor This is an out of mechanism that allows storage management over web based APIs.

VVOL-filter—may be a VM utilizing a specialized Virtual machine, which may provide an infrastructure that allows for introducing a "device driver" into the virtualized IO stack provided by the Virtual machine Virtual RPA (vRPA)/Virtual DPA (vDPA): may be an DPA running in a VM.

VASA may be vSphere Storage application program interfaces (APIs) for Storage Awareness.

DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

A discussion of journal based replication may be integrated with a virtual service layer. may be found in U.S. patent application Ser. Nos. 13/077,256, 13/077,262, and 13/077,266, entitled "CONSISTENT REPLICATION IN A GEOGRAPHICALLY DISPERSE ACTIVE ENVIRONMENT," "INVERSE STAR REPLICATION," and "NETWORKED BASED REPLICATION OF DISTRIBUTED VOLUMES," respectively, filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
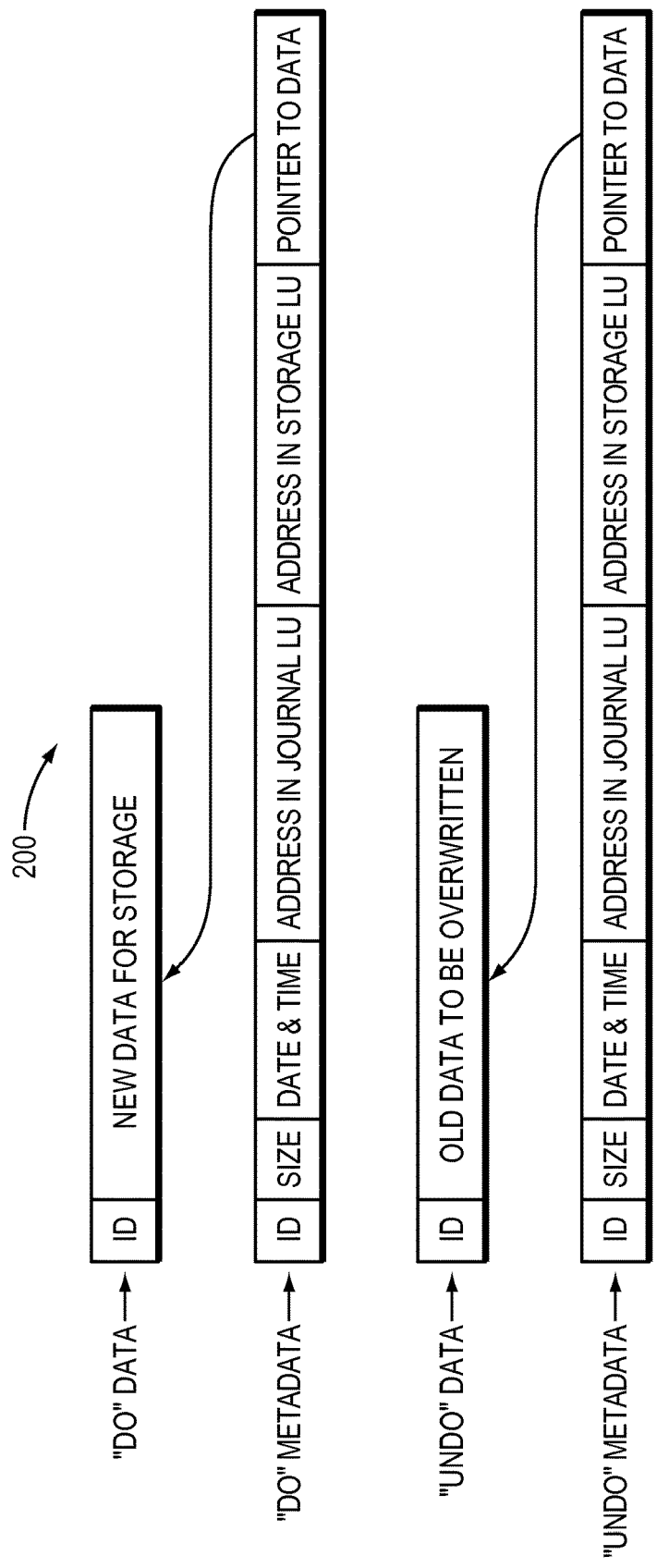
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:

one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter may mirror write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of the different locations between local and remote sites. For example, a delta marking stream at the target might have data too if a user has accessed an image at the target site.

The initialization process may create one virtual disk out of the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Replication of a Virtual Machine Using a Replication Layer

Figure 3:
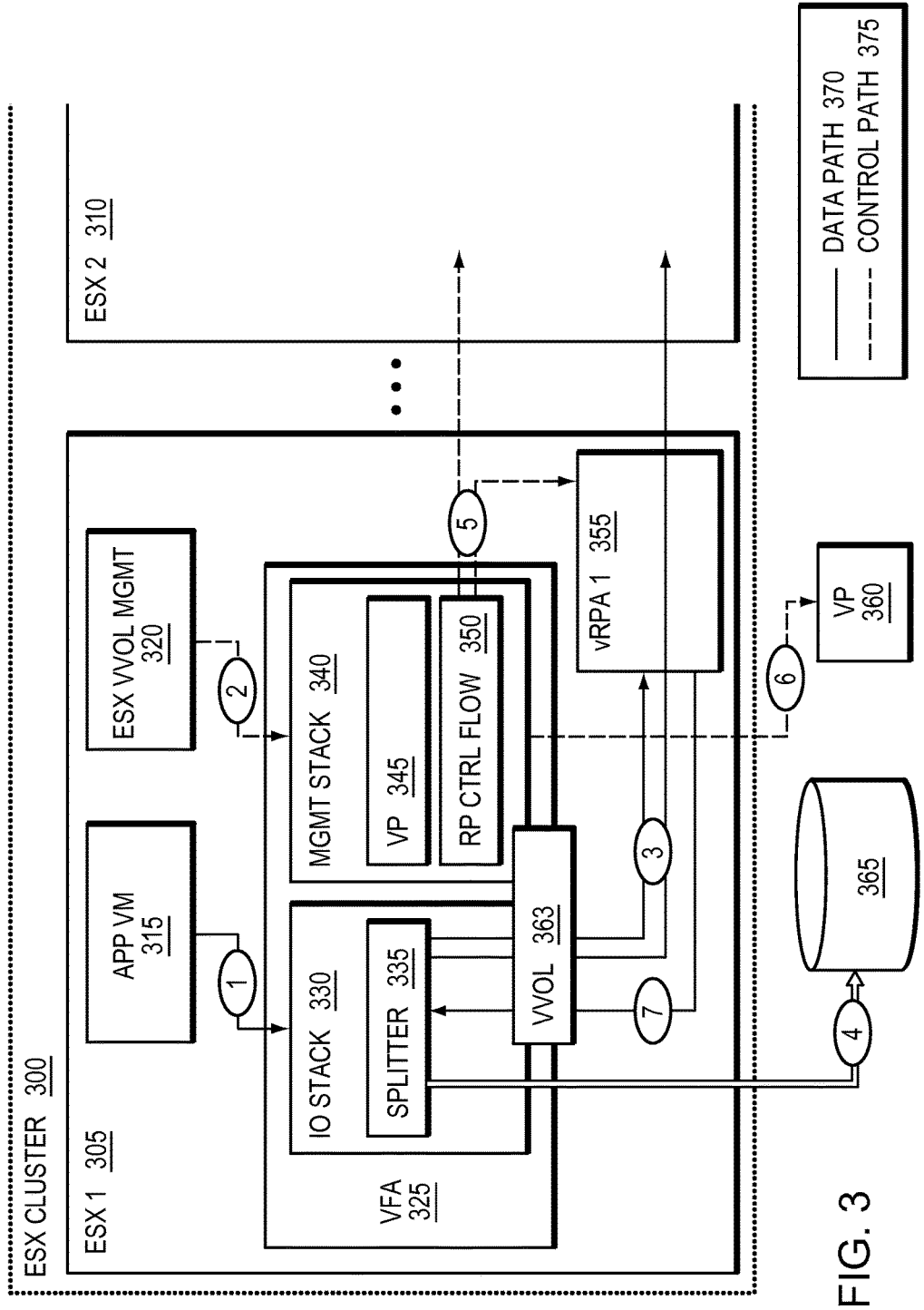
FIG. 3 is a simplified illustration of a hypervisor in a hypervisor cluster, in accordance with an embodiment of the present disclosure.
Figure 4A:
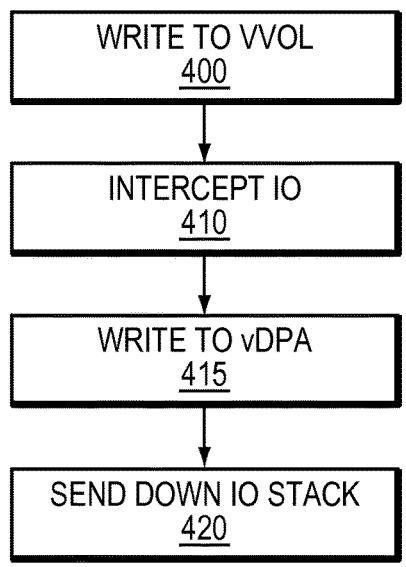
FIG. 4*a* is a simplified example of a method for splitting IO for a virtual machine, in accordance with an embodiment of the present disclosure.
Figure 4B:
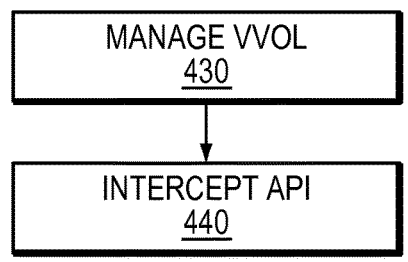
FIG. 4*b* is a simplified example of a method for managing a VVOL, in accordance with an embodiment of the present disclosure.

Refer now to the example embodiment of FIG. 3. In the embodiment of FIG. 3, there is ESX Cluster 300, which is an example embodiment of a VMware of a hypervisor, but the techniques described herein may be applied to any type of hypervisor and virtualization. ESX cluster 300 has ESX hypervisor 305 and ESX hypervisor 310. ESX hypervisor 305 has application VM 315, ESX VVOL management 320, VFA 325 and VDPA 355. VFA 325 has IO stack 330 and IO stack 330 has splitter 335. VFA also has management stack 340, which has VP (vasa provider) 345 and replication control flow, (RP) control flow, 350. As well in FIG. 3, there is disk 365 and VP 360, which is a vasa provider, which is a management mechanism Refer now to FIGS. 3, 4a, and 4b, Application VM 315 may write to VVOLs, such as VVOL 363, exposed by VFA 325 through a path generated (step 400). Splitter 335 may intercept IO (Step 410). Splitter 335 may write to DPA 355 through iSCSI (step 415) or any other protocol. IOs may complete down the stack 330 (step 420). DPA 355 may issue IOs to storage 365.

ESX 305 manages the VVOLs on VFA 325 using a VASA protocol (step 430). Some VASA APIs are intercepted by specific code on VFA 325 and may be delivered to DPAs 355 as notifications (step 440). Most VASA APIs may be forwarded to the backend storage through the infrastructure. In some embodiments, a VASA API may be able to create new VVOLs, bind VVOLs, and change VVOLs policy.

In an embodiment, a virtualization layer may consume volumes and exposes a file system. In another embodiment, the virtualization layer may consume block devices or file systems. In at least one embodiment, the virtualization layer may present either a file system or blocks. In certain embodiments, each virtual machine disk may be a file. In some embodiments, there may be a VASA provider which may allows management of vvol devices. In at least some embodiments, the file may behave like a VVOL. In some embodiments, a file may behave as VVOL if there is a control mechanism to create/delete/snap/bind the file based on VASA. In some embodiments, the application VM may have an internal disk. In certain embodiments, the disk may be mapped to a file in the file system exposed by the virtualization layer (VFA).

In certain embodiments a VM may produce IO which may be sent to a VFA to process down an IO Stack. In some embodiments, a splitter may be in the IO Stack in the VFA. In at least one embodiment, the splitter may split IO to a VDPA on the same virtual server of ESX as the VM. In another embodiment, the splitter may split the IO to another VDPA on another ESX. In a further embodiment, the splitter may split the IO to another DPA not present on an ESX. In most embodiments, the split IO may be placed into a journal at a replica site. In some embodiments, the journal may be located on a virtual disk or VVOL. In still further embodiments, the journal may be located on a physical disk or physical storage.

In some embodiments, the data in the journal or virtual journal may be applied to a replica of the VM disk. In most embodiments, the journal and the replica of the VM disk may enable point in time access to the data of the VM disk at different times. In certain embodiments, data from the journal or virtual journal may be applied to the replica disk. In most embodiments, as the data from the journal or virtual journal is applied to the replica disk, and undo journal or journal of the changes to the replica of the disk may be created. In most embodiments, the undo journal or journal of the changes may enable the replica disk to be moved back in time. In further embodiments, the journal and undo journal may enable the replica disk to be moved forward and backward in time. In certain embodiments, the replica disk may be moved forward in time by applying DO data to the image. In other embodiments, the replica disk may be moved backward in time by applying the UNDO data to the image.

In some embodiments, multi tenancy may be supported. In most embodiments, a tenant is a grouping of virtual machines. In an embodiment, there may be multiple virtual service layers. In certain embodiments, each of the multiple service layers may support a particular tenant. In most embodiments, the use of a service layer for a particular tenant may enable the data of each tenant to be kept separate from that of other tenants. In at least some embodiments, multiple virtual service layers may communicate with a common DPA or virtual DPA to replicate the data IO of the virtual service layers. In other embodiments different service layer may communicate with different clusters of DPAs.

Figure 5:
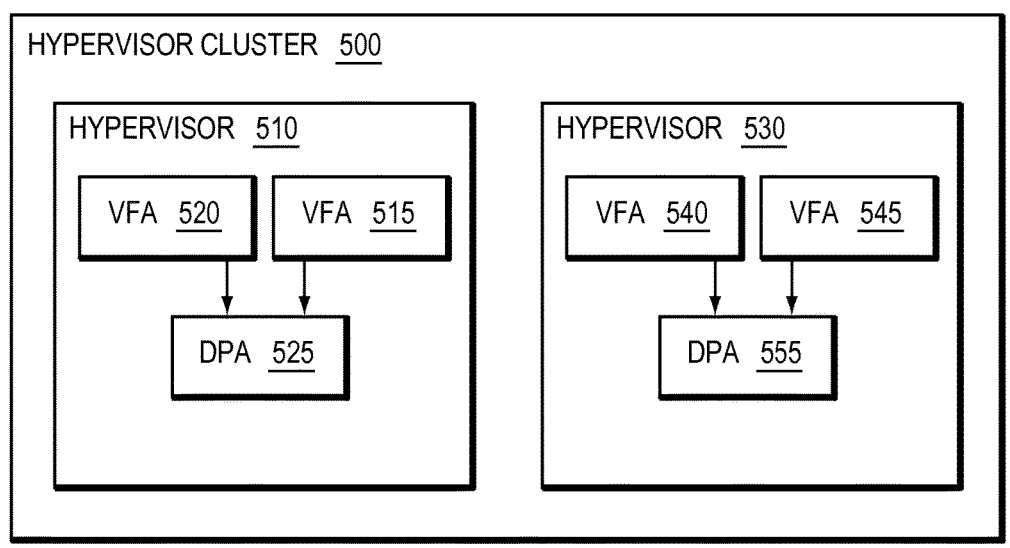
FIG. 5 is a simplified illustration of hypervisors, VFAs, and DPAs, in a hypervisor cluster, in accordance with an embodiment of the present disclosure.

Refer now to the example embodiment of FIG. 5. In the example embodiment of FIG. 5 there are hypervisors 510 and 530. ESX 510 has VFA 520 and VFA 515. VFA 520 and VFA 515 replicate to DPA 525. VFA 520 and VFA 515 generally have a splitter to split IO to DPA 525. Hypervisor 530 has VFA 540 and VFA 545. VFA 540 and 545 split IO to DPA 555.

Figure 6:
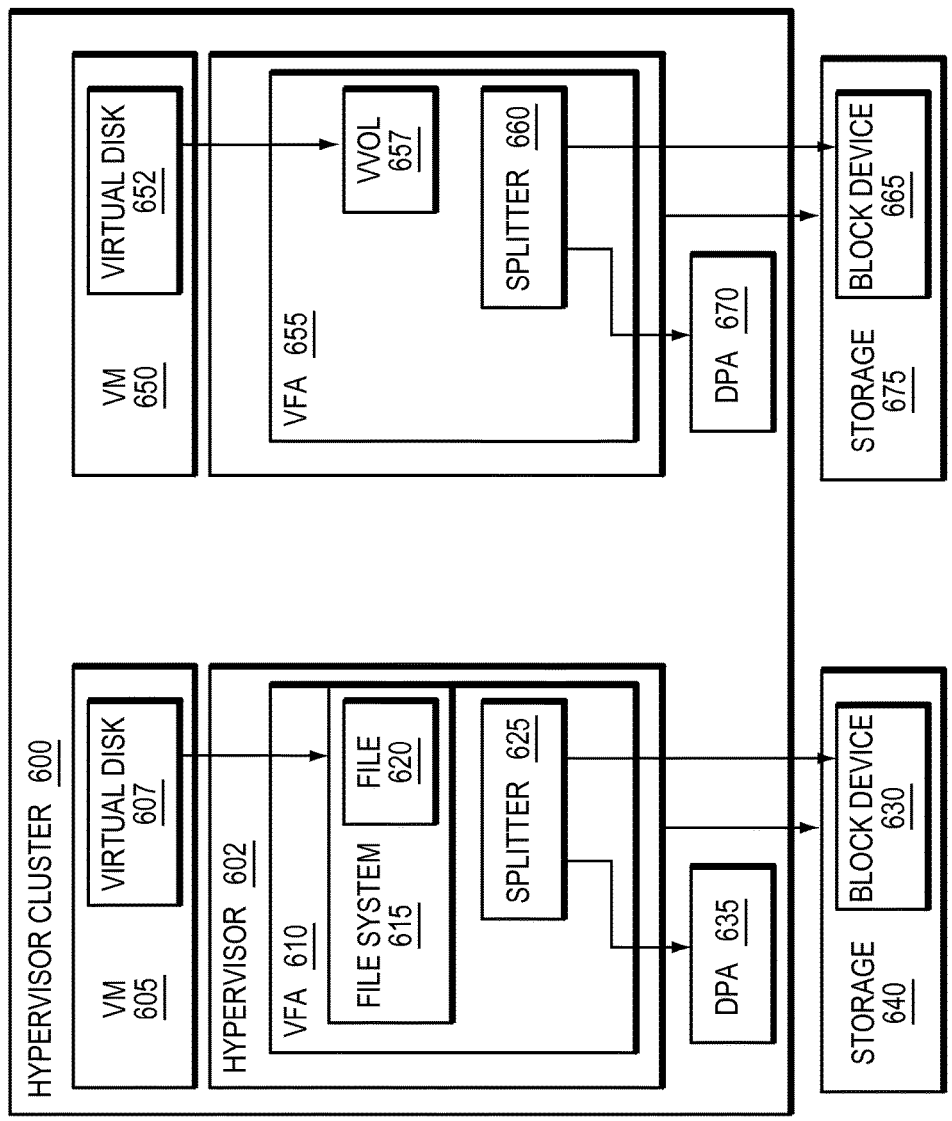
FIG. 6 is a simplified illustration of slitting IO for a virtual machine writing data to a hypervisor, in accordance with an embodiment of the present disclosure.

Refer now to the example embodiment of FIG. 6. In the example embodiment of FIG. 6, host or virtual machine 605 sends IO to VFA 610, which are in hypervisor cluster 600. VFA 610 is contained in hypervisor 602. VFA 610 has FS 615 and File 620, the virtual disk of VM 605 is mapped to file 620 exposed by VFA 610. VFA 610 also consumes block device 630 from block storage 640 and creates a file system over the exposed block storage device 630, the file system may be a distributed file system and files may be accesses also by other hypervisors running a similar VFA. VM 605 sends IO to VFA 610 to File 620. Splitter 625 splits IO to DPA 635.

VFA 655 is also in hypervisor cluster 600. VFA 655 exposes VVOL to VM 650, which VM 650 consumes as virtual disk 652. IO from VM 650 written to Virtual disk 652 written to VVOL 657 on VFA 655 passes to splitter 660. Splitter 660 creates a copy of the IO and sends it to Virtual DPA 670. Splitter 660 also sends the IO down the IO stack to Block device 665, which resides on storage 675. Refer now to the example embodiment of FIG. 7. In the example embodiment of FIG. 7, virtual machine 705 sends IO to VFA 710, which is on Hypervisor cluster 700. VFA 710 exposes file 720 and consumes File 730 from file system 740. An IO sent from VM 705 to virtual disk 707 is sent to file 720 exposed by VFA 710. The IO is split by splitter 725, which sends a copy of the IO to Virtual DPA 735 and the IO to File 730.

VM 750 is also in hypervisor cluster 700. VM 750 has virtual disk 752 which corresponds to VVOL 757 exposed by VFA 755. An IO written by VM 750 progresses to virtual disk 752 to VVOL 757. The IO is split by Splitter 760. A copy of the IO is sent to virtual DPA 770 and the IO is sent to File 765 in file system 775. The data of VVOL 757 may be stored in file 765, but VVOL 757 may be accessed by block protocols like iSCSI or other block protocols.

Figure 7:
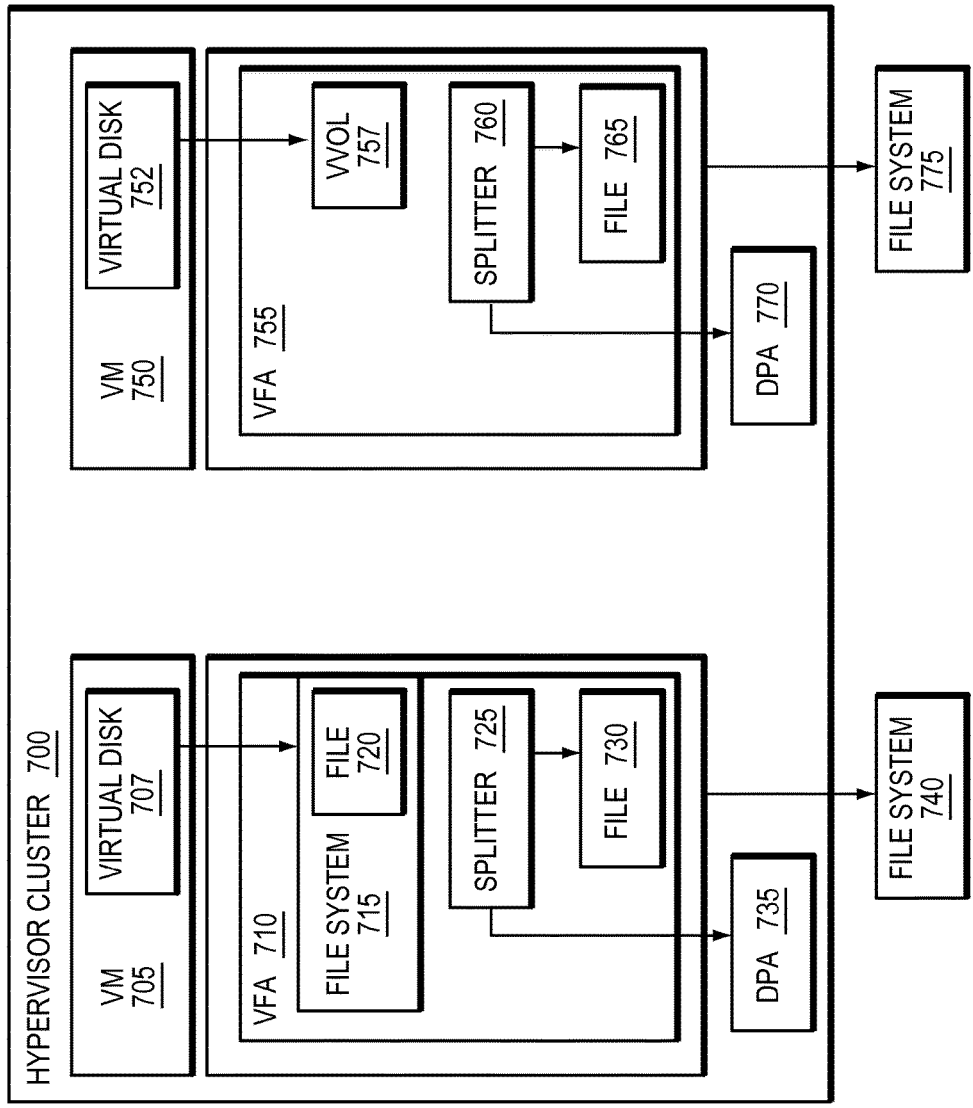
FIG. 7 is an alternative simplified illustration of slitting IO for a virtual machine writing data to a hypervisor, in accordance with an embodiment of the present disclosure.

The example embodiments of FIGS. 6 and 7 show 4 example embodiments of the current techniques. In a first embodiment, the backend storage is block and the VFA exposes a block based VVOL. In a second embodiment, the backend storage is block based and the VFA exposes file system with or without a VVOL. In a third embodiment, the backend storage is a file system and the VFA exposes a block based VVOL. In a fourth embodiment, the backend storage is file system and the VFA exposes file system with or without a VVOL. In another embodiment, the backend storage may be a VVOL and the VFA may create a VVOL by creating a VVOL at the backend and having the VFA expose a VVOL. In most embodiments, there may be a splitter, a virtual replication protection appliance, a virtual machine, and a backend. In some embodiments, a VFA may also consume file or block devices and expose standard SCSCI block based devices.

Figure 8:
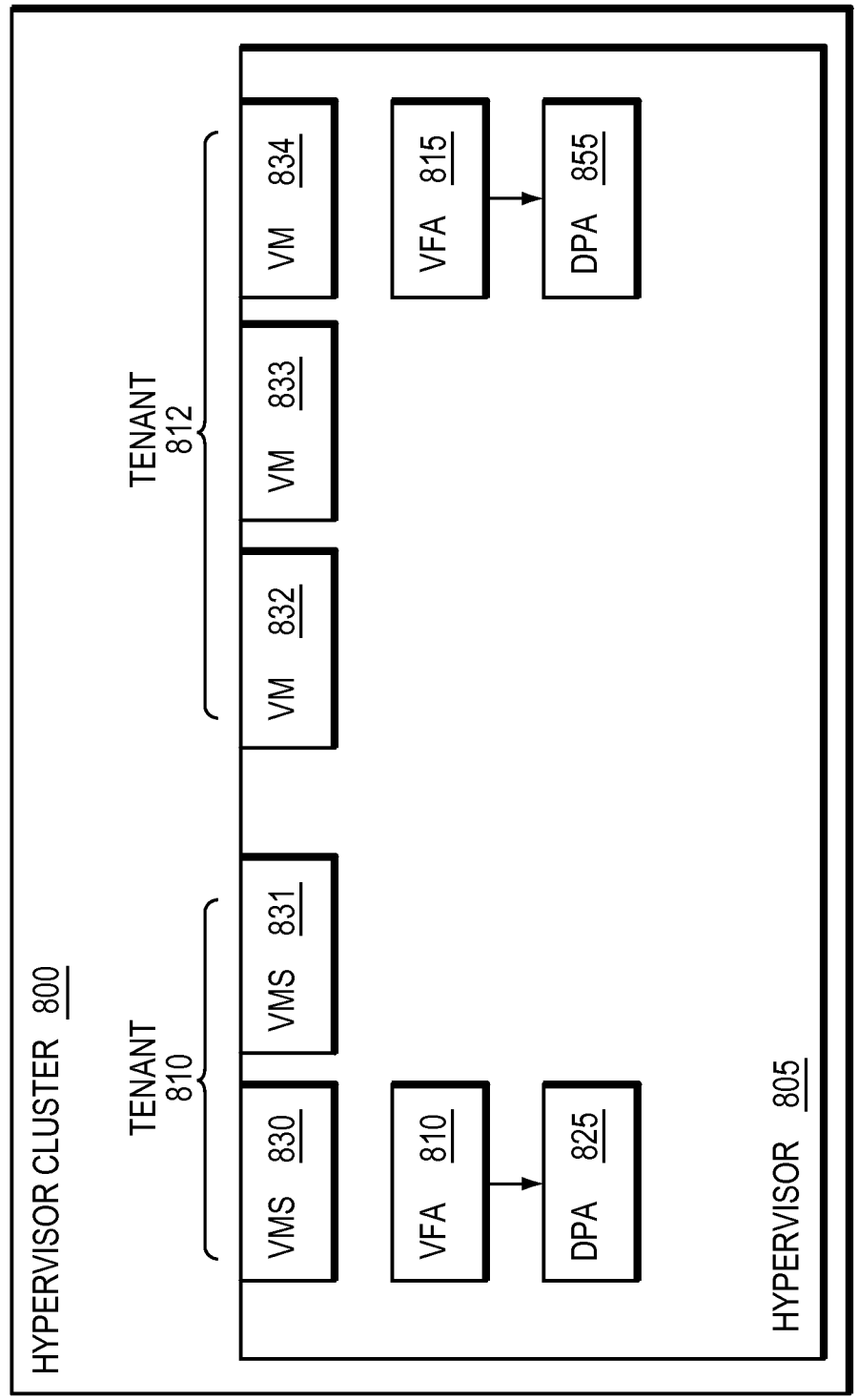
FIG. 8 is a simplified illustration of tenants, where each tenant has two or more virtual machines, in accordance with an embodiment of the present disclosure.

Refer now to the example embodiment of FIG. 8. In the example embodiment of FIG. 8, ESX cluster 800 has ESX hypervisor 805. Tenant 810 is made up of VM 830 and VM 831. VMs 830,831 send IO to VFA 810 which splits the IO to DPA 825. Tenant 812 has VMs 832, 833, and 834. VMs 832, 833, and 834 send IO to VFA 815. VFA 815 splits IO to DPA 855.

Figure 9:
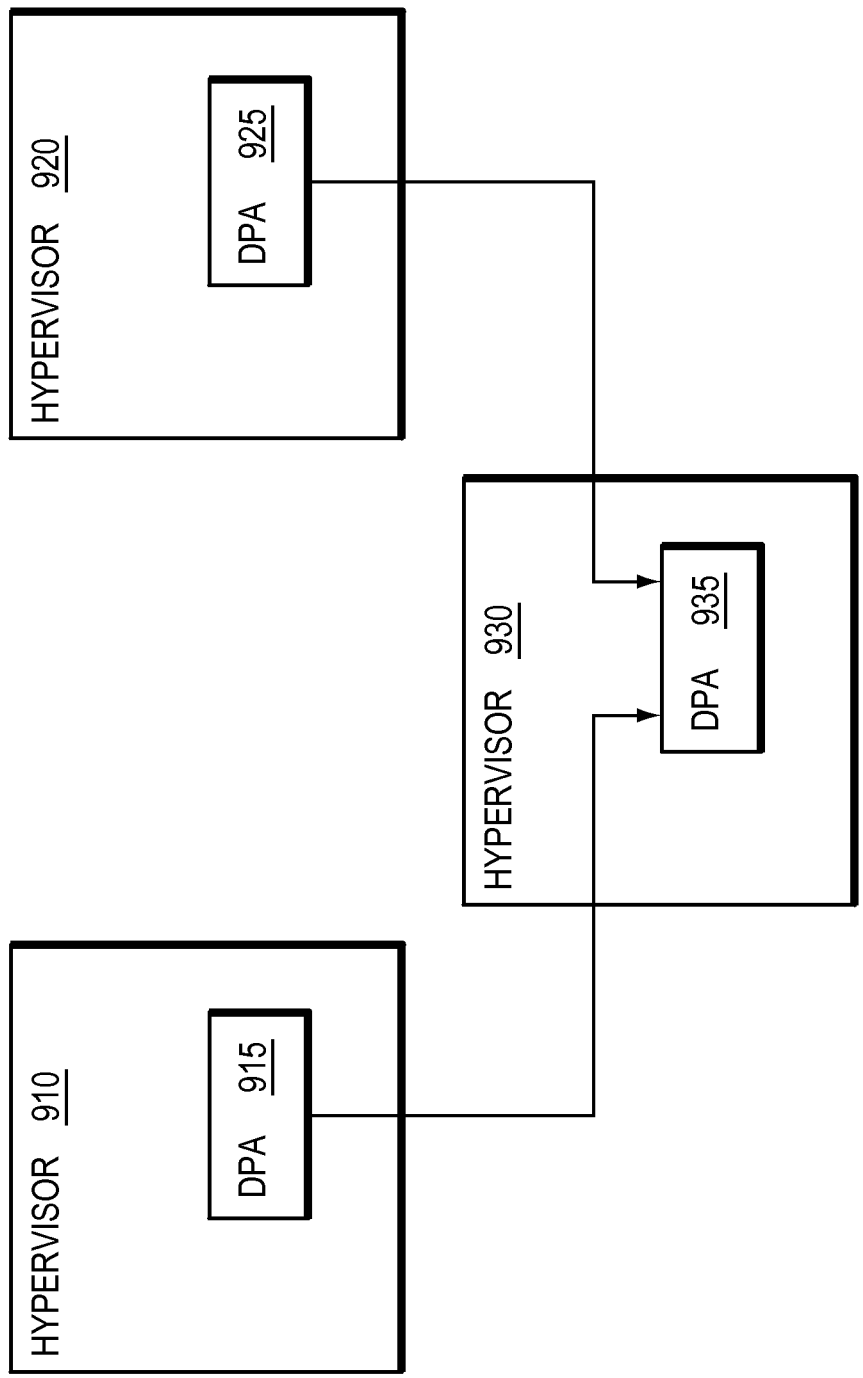
FIG. 9 is a simplified illustration of two DPAs on two separate hypervisors replicating to a DPA on a third hypervisor, in accordance with an embodiment of the present disclosure.

Refer now to the example embodiment of FIG. 9. In the example embodiment of FIG. 9, Hypervisor 910 has DPA 915. Hypervisor 920 has a virtual DPA 925. DPAs 915 and 925 replicate to DPA 935 on Hypervisor 930. In certain embodiments, a protocol may be used as a VDPA may not see the volumes exposed by a VFA. In some embodiments, a VFA may run on a different hypervisor than the vRPA. In certain embodiments, the VFA may split the IOs and access to volumes may be exposed by a specific VFA may be limited to the hypervisor on which the VFA runs. In another embodiment, a hypervisor may limit the amount of devices that a virtual machine may access.

Figure 10:
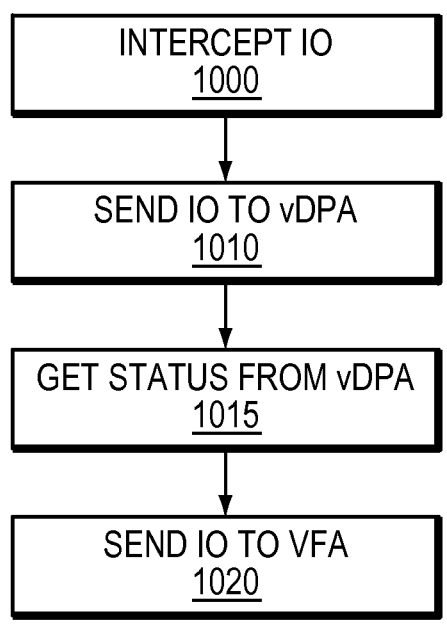
FIG. 10 is a simplified example of a method for splitting IO for a virtual machine, in accordance with an embodiment of the present disclosure.

Refer now to the example embodiment of FIG. 10. In the example embodiment of FIG. 10, IOs written to the volumes are intercepted (step 1000). The IOs are sent to the VDPA (step 1010). The status is received from the VDPA (step 1015). IOs are sent to the VFA backend (step 1020).

Figure 11:
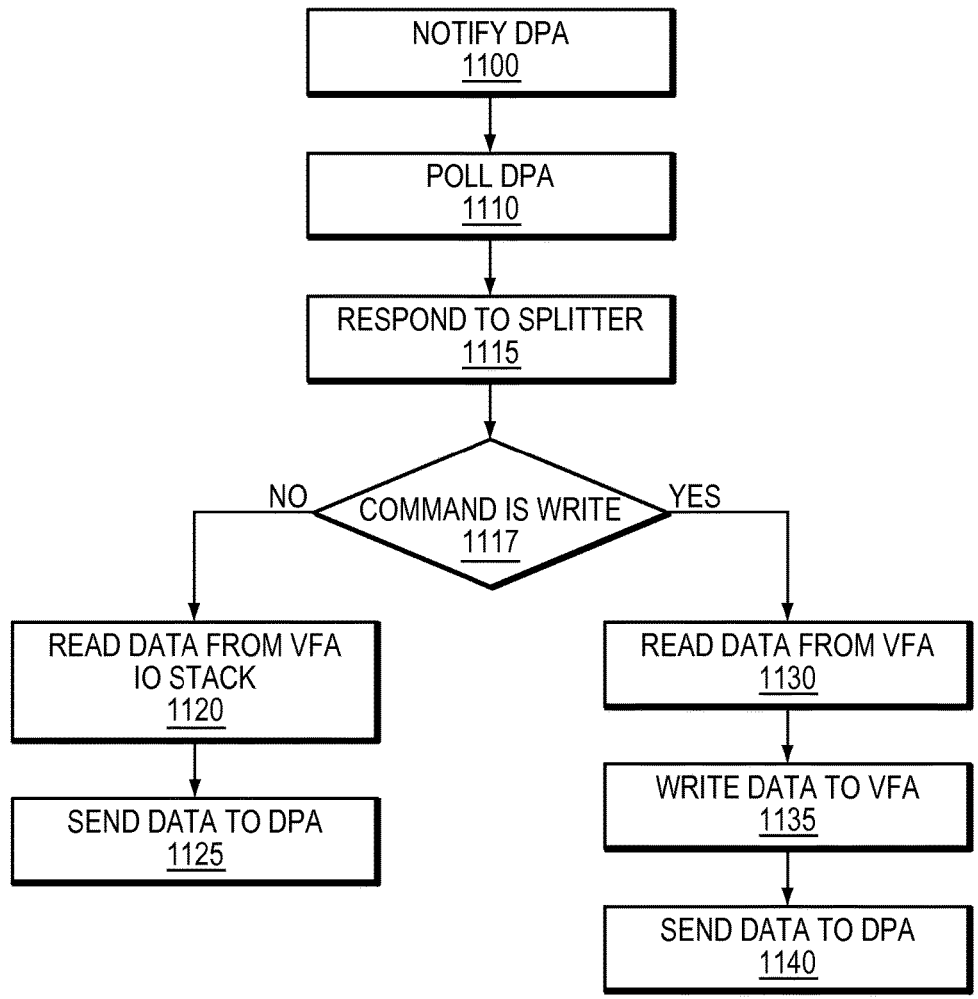
FIG. 11 is a simplified example of a method of a vDPA reading and writing IOs through a splitter to the volumes expose by the VFA, in accordance with an embodiment of the present disclosure.

Refer now to the example embodiment of FIG. 11. The example embodiment of FIG. 11 illustrates how a vDPA may read and write IOs through the splitter to the volumes expose by the VFA and which may not be exposed to the vDPA. In the example embodiment of FIG. 11, the splitter notifies vDPA on exiting volumes (step 1100). The splitter polls data for command using read (step 1110). DPA responds with command meta data to the splitter (step 1115). A determination is made if the command is a write (step 1117). If the command is not a write, i.e. command is read, the splitter reads data from the VFA IO stack (step 1120). The splitter sends data to the DPA (step 1125). If the command is a write, the splitter reads data from the DPA (i.e. the data that to be written to the volume exposed by the VFA) (step 1130). The splitter writes data to the VFA IO stack (step 1135). The splitter sends the write status to the DPA (step 1140).

Figure 12:
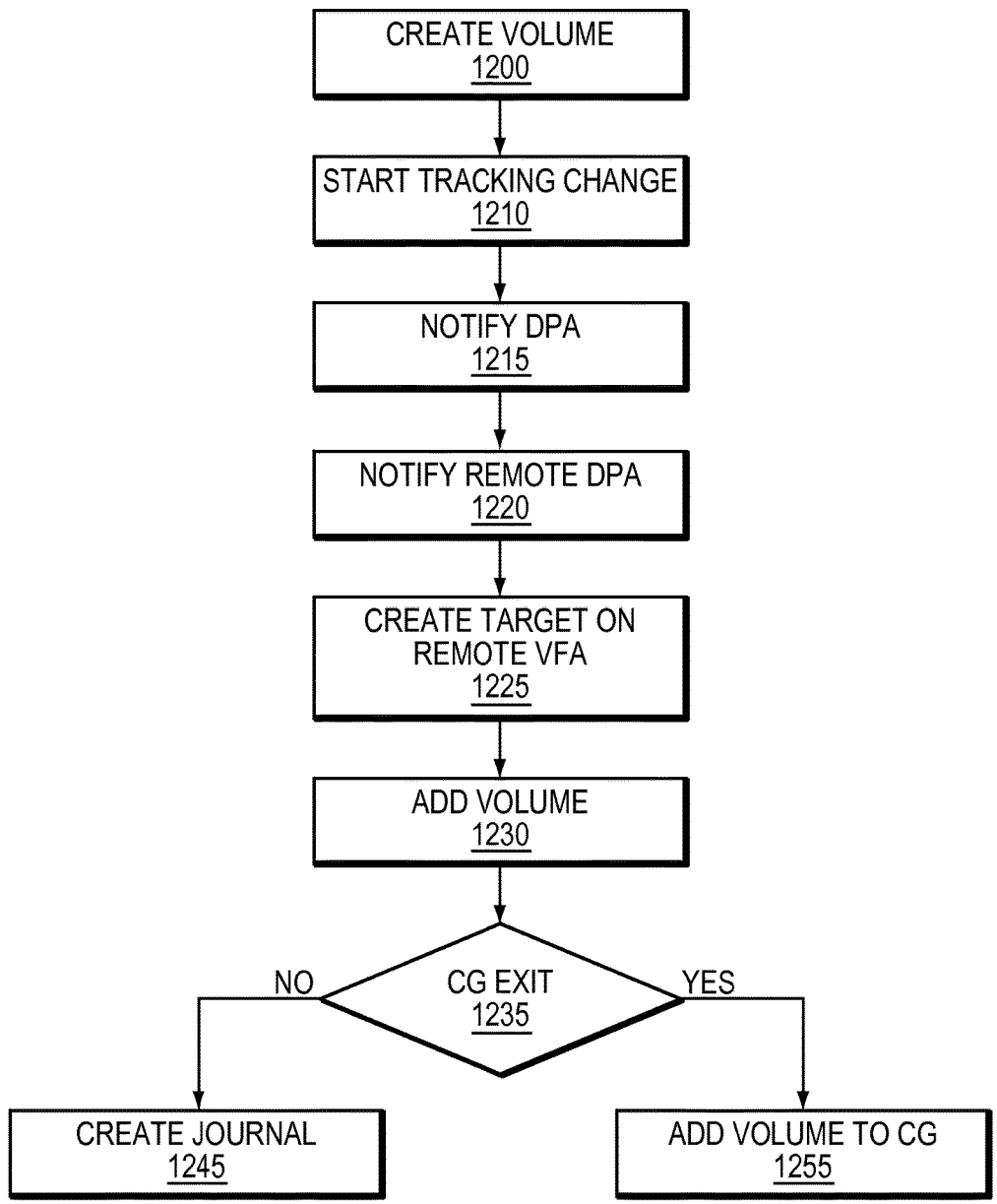
FIG. 12 is a simplified example of a method of creating a new volume to be replicated, in accordance with an embodiment of the present disclosure.

Refer now to the example embodiment of FIG. 12. In the example embodiment of FIG. 12, a volume is created on the VFA or moved to the VFA (step 1200). The splitter starts tracking changes (step 1210). The splitter notifies the vDPA (step 1215). The vDPA notifies the remote vDPA (step 1220). The remote vDPA creates a target volume on the remote VFA (step 1225). The volume is added to the consistency group according to the profile set by the user (step 1230). A determination is made if the consistency group exists (step 1235). If the consistency group exists, the volume is added to the consistency group (step 1245). If the consistency group a volume is created (step 1255).

Figure 13:
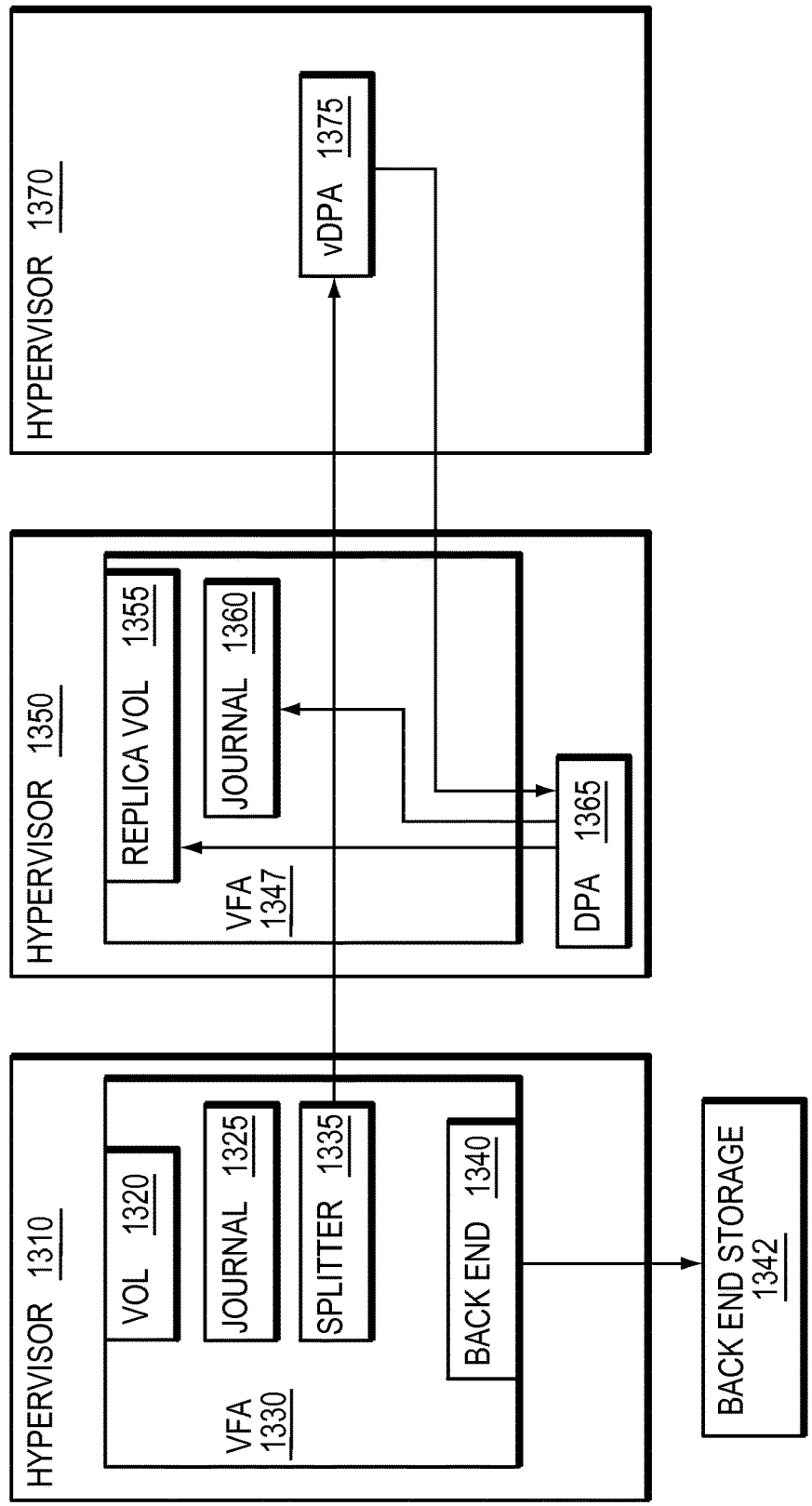
FIG. 13 is a simplified illustration of two DPAs on two separate hypervisors, where IOs are split by a splitter on a third hypervisor to a first of the two DPAs and the IO are replicating by the second DPA, in accordance with an embodiment of the present disclosure.

Refer now to the example embodiment of FIG. 13. In the example embodiment of FIG. 13, hypervisor 1310 has VFA 1330. Hypervisor 1350 has VFA 1347 and DPA 1365. Splitter 1335 splits to VDPA 1375, which sends the IO to vDPA 1365. VFA 1330 has volume 1320 and journal 1325. VFA 1330 also has splitter 1335 and back end storage 1342. VFA 1347 has replica volume 1355 and journal 1360. VFA 1330 replicates split IO to VDPA 1365 which may write the IOs replicated to a journal and to a replica volume to allow point in time access.

Figure 14:
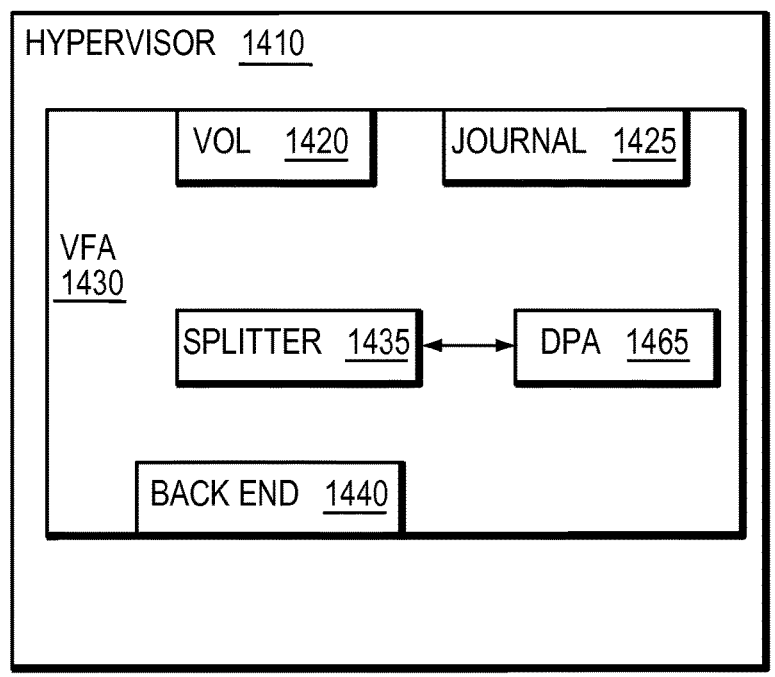
FIG. 14 is a simplified illustration a splitter splitting IO to a DPA located on the same hypervisor, in accordance with an embodiment of the present disclosure.

Refer now to the example embodiment of FIG. 14. In the example embodiment of FIG. 14, Hypervisor 1410 has VFA 1430. VFA 1430 exposes VOL 1420 and has journal 1425. VFA 1430 also has splitter 1435 and replication processes 1465, which may be the processes of the replication appliance running inside the VFA. Splitter 1435 communicates with virtual DPA 1465 through inter-process communication. VFA 1430 also has back end 1440.

In certain embodiments, consistency groups of virtual machine running on separate ESX servers may be created. In a particular embodiment, a first DPA may replicate the volumes in the CGs. In certain embodiments, the splitters may be configured to split the data to the DPA replicating the volume. In another embodiment, virtual CGs may be created. In some embodiments, virtual consistency groups may be created to enable a consistent point in time across multiple CGs (have a virtual CG may be containing multiple CGs). In certain embodiments, virtual consistency groups may be created by quiesing IO activity at the relevant splitters and creating consistency point at the relevant CGs.

Figure 15:
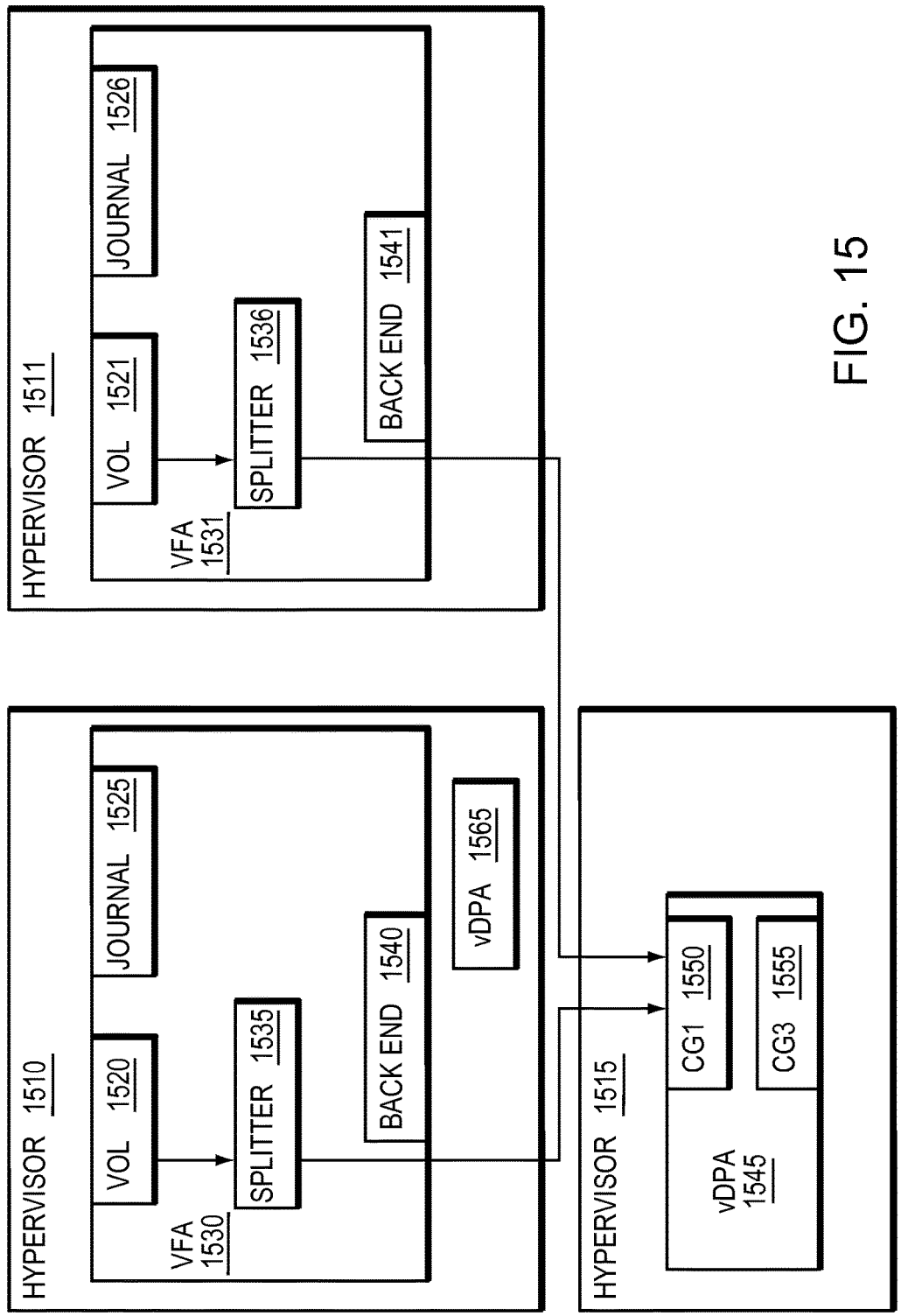
FIG. 15 is a simplified illustration of two splitters in running on two different hypervisors splitting IO to a DPA located on a third hypervisor, where IO from both splitters are replicated to the same consistency group, in accordance with an embodiment of the present disclosure.

Refer now to the example embodiment of FIG. 15. The example embodiment of FIG. 15 shows 3 hypervisors 1510, 1511, and 1515. There are two volumes 1520 and 1521 replicated to vDPA 1565, and are in the same CG1 1550. Splitter 1535 on hypervisor 1510 sends intercepted IOs to CG1 1550 running on VDPA 1545 running on hypervisor 1515, Splitter 1536, running on hypervisor 1511, splits IOs to CG1 1550 running on VDPA 1545 running on hypervisor 1515. The splitting protocol results in write order fidelity between volume 1520 and volume 1521.

Figure 16:
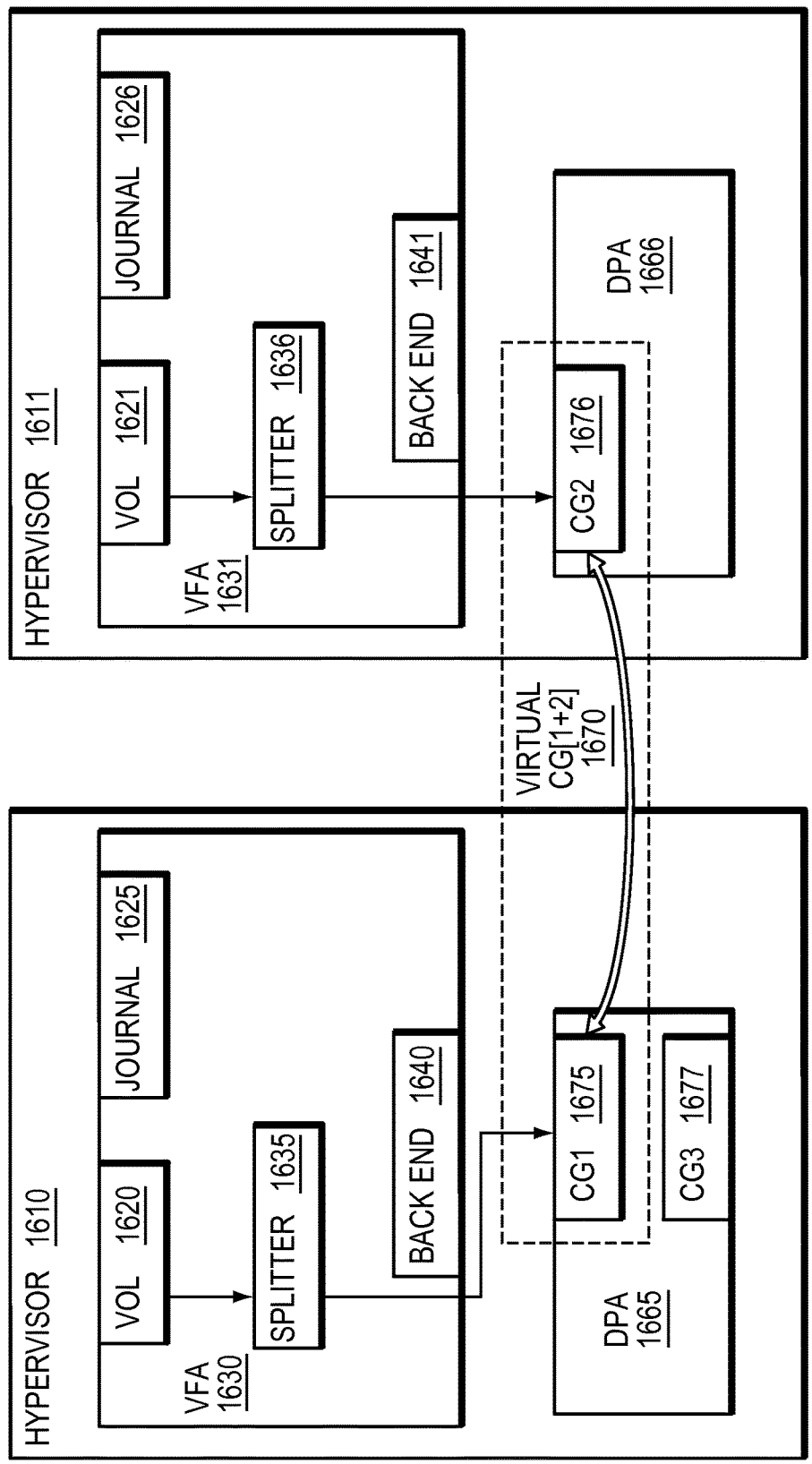
FIG. 16 is a simplified illustration a virtual consistency group in a virtual environment, in accordance with an embodiment of the present disclosure.

Refer now to the example embodiment of FIG. 16. In the example embodiment of FIG. 16, each volume 1620, 1621 is in either CG 1675 or 1676. Virtual CG 1670 represents a combination of CG 1675 and 1676. In some embodiments, for a virtual CG, a bookmark may be created by quiessing the volume creating a bookmark in each CG and unquiescing. During the creation of the bookmark new IO do not complete to volumes 1620 and 1621. The bookmarks represent a point in time which is consistent across both CGs 1675 and 1676.

In certain embodiments, there may be journaling at the replica site. In certain embodiments there may be a journal of the transactions at the replica site, which may include both the ability to do and undo data. In some embodiments, it may be enabled to access any point in time access by rolling the journal to the relevant point in time. In other embodiments, insertion of metadata in the journal may be enabled where meta data may include point in time information and consistency information to allow rolling the journal to a relevant point in time.

Leveraging Snapshots

In some embodiments, a vDPA and a filter may run on the same hypervisor. In certain embodiments, if the DPA and filter are on the same hypervisor, a crash of the hypervisor may case data loss, which may be because the data is stored is cache in the DPA memory. In certain embodiments, after a single crash the system may need to read the data in the volumes in order to be in sync, which may consume significant amount of time and may reduce the total customer experience.

In certain embodiments, an API may enable snapshots to be leveraged to reduce or remove information loss. In some embodiments, periodic snapshots may be taken.

In certain embodiment, a snapshot may be taken at a time interval, such as 10-30 minutes, using a VASA VVOL API (with a command such as createVVOL snapshot) for creating a snapshot or virtualization layer snapshot. In some embodiments, in a case where the virtualization layer exposes VVOLs and also consumes VVOLs from the backend storage, the snapshot may be created at the backend storage. In other embodiments, a snapshot mechanism may be implemented within the virtualization layer. On other embodiments the snapshot may be created in the backend storage or at the VFA using a proprietary API or storage API.

In some embodiments, it may be ensured data included in the snapshot arrived to a replica site. In at least one embodiment, if a delta marker stream is used, the current metadata may be flushed to delta marker stream. In an embodiment, an older snapshot may be removed if data changes contained in the snapshot have arrived to the replica site or the metadata or the changes were flushed to the delta marking stream persistent store.

In other embodiments, after a crash, recovery may include using VVOL diff API (such as the VASA API unsharedBitmapVirtualVolume) or virtualization layer diff to get difference between latest snapshot and current data or a diff api provided by backend storage array. In certain embodiments, the differences may be added to the delta marking stream synchronize the differences. In at least one embodiment, if no delta marking stream is used these, differences between the images may be synched. In further embodiments, a tracking mechanism may be used to track changes in a bitmap.

In certain embodiments, a change tracker may use a bitmap to track the changes. In some embodiments, the change tracker has a start tracking command and end tracking command. In other embodiments, there may be a command to read the current changes bitmap. In further embodiments, there may be multiple change trackers. In certain embodiments, the change tracker may start tracking changes in a first tracker, start tracking changes in a second tracker, flush data containing changes from the first tracker to a delta maker or replica, delete the first change tracker, rename the second change tracker to be the first change tracker, and after a certain period of time, repeat the steps.

In certain embodiments, tracking may be added as a VASA command or as a command to the virtualization layer. In other embodiments, the virtualization layer may implement persistent tracks, which may have severe performance effects. In further embodiments, the virtualization layer may leverage some backend array tracking abilities.

Figure 17:
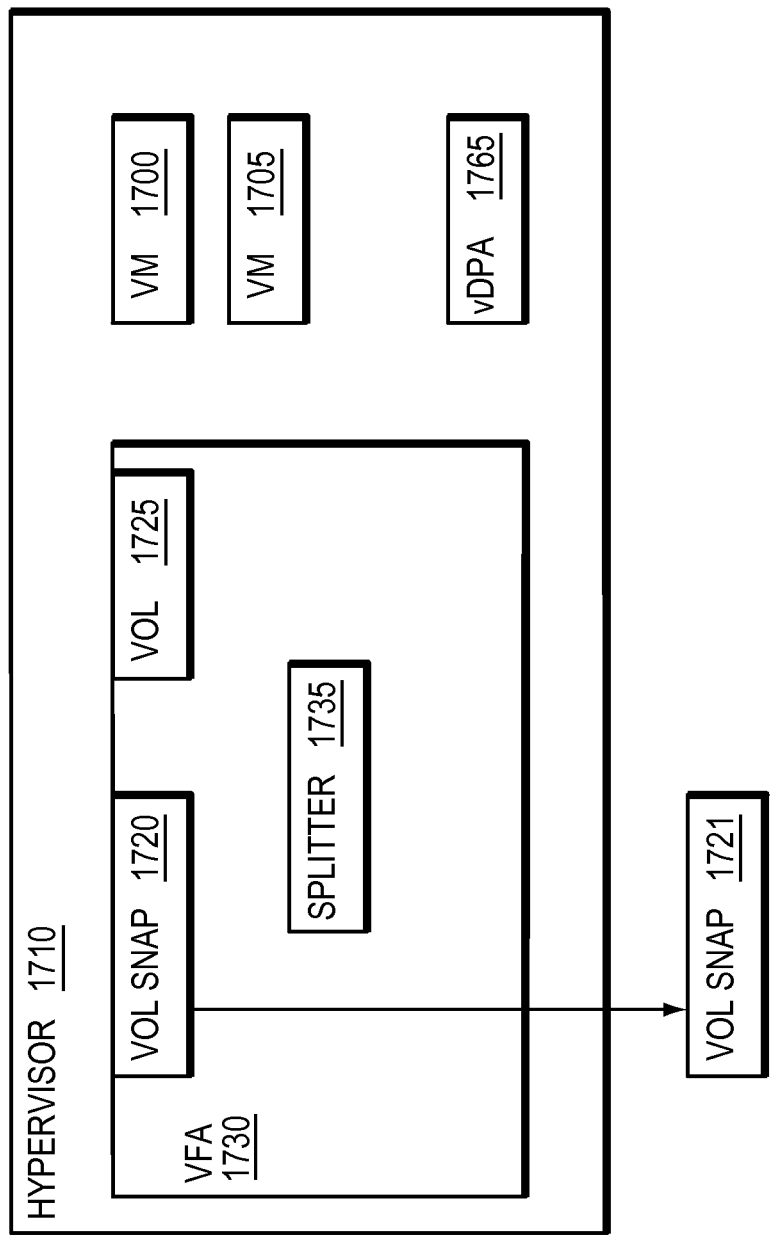
FIG. 17 is a simplified illustration of taking a snapshot in a virtual environment, in accordance with an embodiment of the present disclosure.

Refer now to the example embodiment of FIG. 17. Hypervisor 1710 has VM 1700, VM 1705, VDPA 1765 and VFA 1720. VFA 1730 has Volume snapshot 1720, volume 1725, and splitter 1735.

Figure 18:
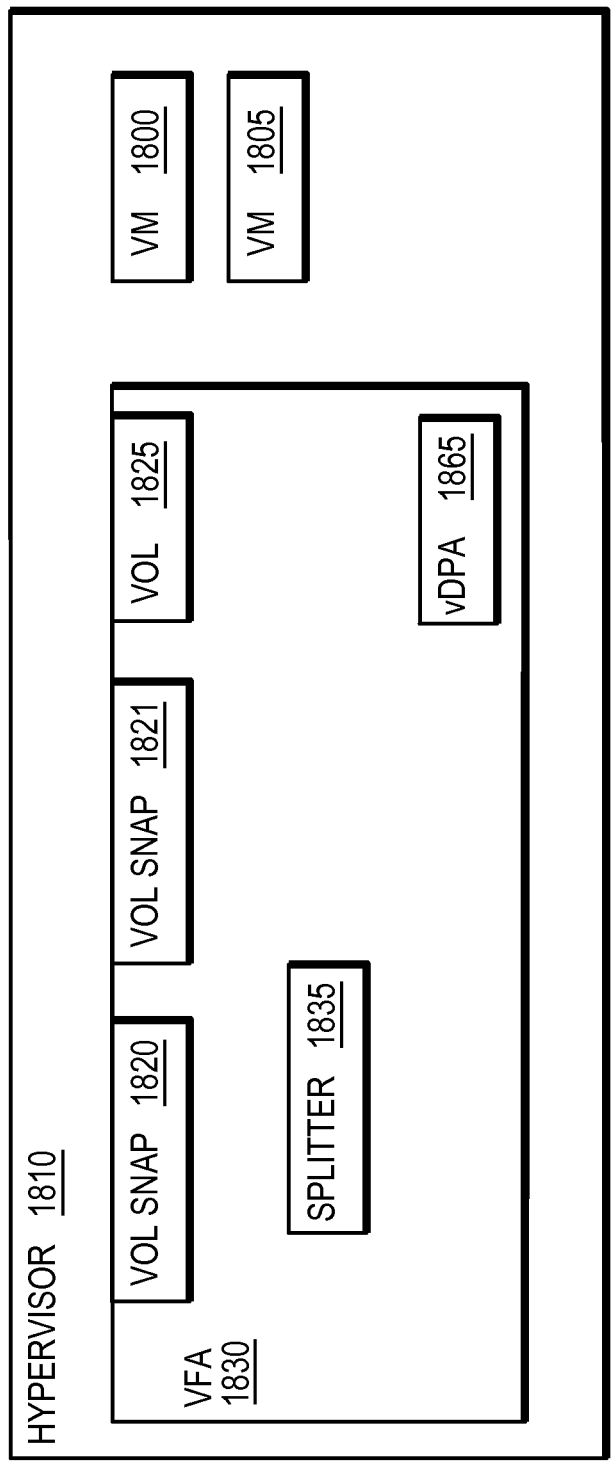
FIG. 18 is a simplified illustration of multiple snapshots in a virtual environment, in accordance with an embodiment of the present disclosure.

Refer now to the example embodiment of FIG. 18. In the example embodiment of FIG. 18, Hypervisor 1810 has VM 1800, VM 1805, and VFA 1830. VFA 1830 has volume 1825, volume snapshot 1820, and volume snapshot 1821. VFA 1830 also has splitter 1835 and DPA 1865.

Figure 19:
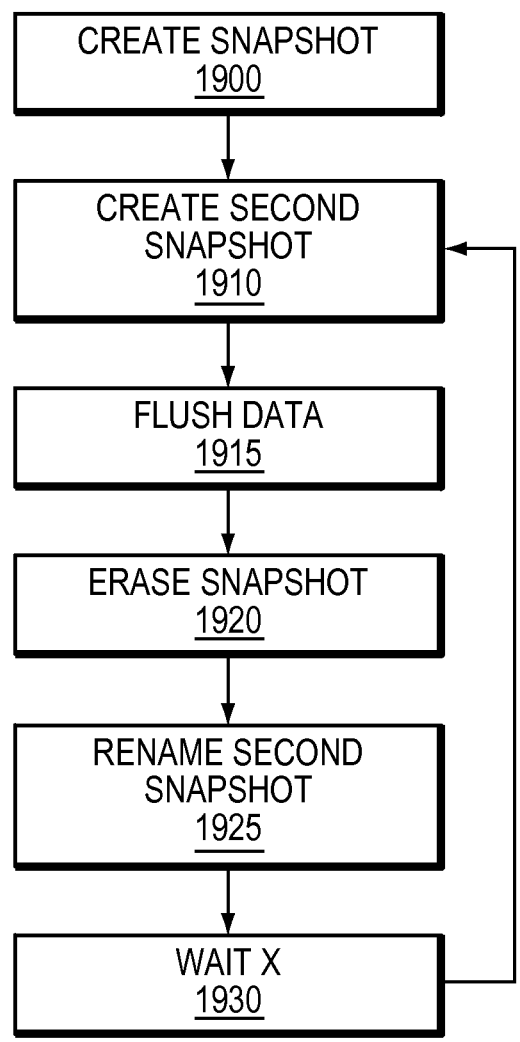
FIG. 19 is a simplified example of a method for taking snapshots, in accordance with an embodiment of the present disclosure.

Refer now to the example embodiment of FIG. 19. A first snapshot is created (step 1900) (e.g. snapshot 1820). A second snapshot is created (step 1910)(e.g. snapshot 1821). The data of the first snapshot is flushed to either a replicate site or to a marking stream (step 1915). The first snapshot is erased (step 1920) (e.g. snapshot 1820). The second snapshot is renamed to be the first snapshot (step 1925) (e.g. rename 1821 to 1820), the naming may be logical and may not otherwise change the snapshots. The system pauses for a set time and repeats steps 1910 through 1925 (step 1930).

Figure 20:
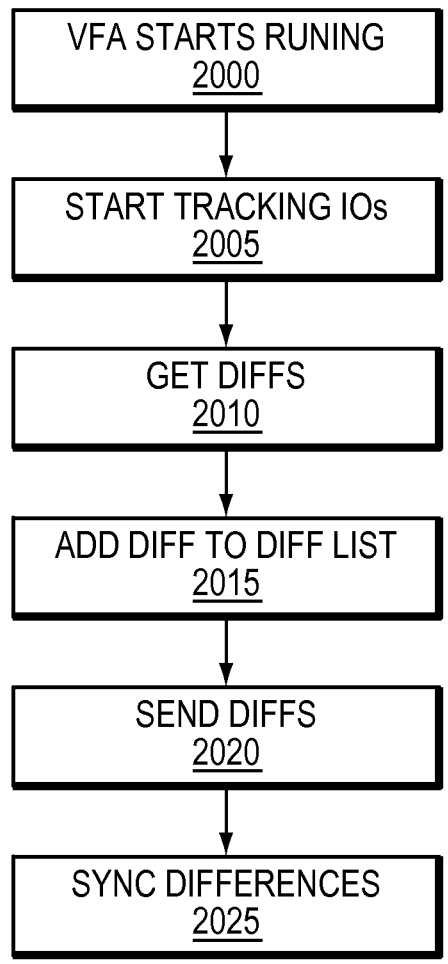
FIG. 20 is a simplified example of a method for data recovery of a system after a crash of a hypervisor, in accordance with an embodiment of the present disclosure.

Refer now to the example embodiment of FIG. 20. FIG. 20 shows a method for data recovery of a system after a crash of a hypervisor. In some embodiments, the virtual machines running on the original hypervisor may move to run on a different hypervisor using HA (high availability mechanisms). In certain embodiments, the volumes of the virtual machine may be expose by the VFA running on the new hypervisor. In other embodiments the original hypervisor may recover.

VFA starts running (step 2000). IO arriving to the VFA exposed volume are being tracked (step 2005). The splitter starts splitting new incoming IOs (step 2010). Using an API, the differences between the first snapshot and the current image are gotten (step 2010). The differences are added to a diff list (step 2015). The differences are sent to the vDPA (step 2020). The vDPA synchronizes the differences between the production and replica volumes (step 2025).

Figure 21:
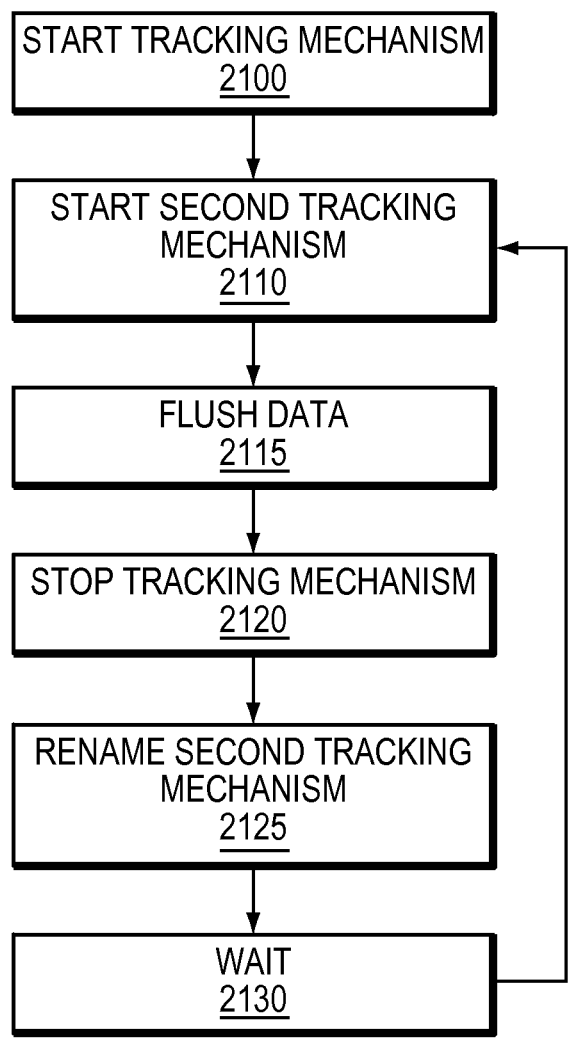
FIG. 21 is an alternative simplified example of a method for data recovery of a system after a crash of a hypervisor, in accordance with an embodiment of the present disclosure.

Refer now to the example embodiment of FIG. 21 which describes a similar example to that of the example of FIG. 19 with a change tracker rather than snapshot mechanism. A tracking mechanism is started for a first snapshot (step 2100). A tracking mechanism is started for a second snapshot (step 2110). The data from the start of the first tracking mechanism is flushed (step 2115). The first tracking mechanism is stopped (step 2120). The second tracking mechanism is renamed (i.e. logically) the first tracking mechanism (step 2125). The process waits for a set time (step 2130). Steps 2110-2130 may be repeated.

Figure 22:
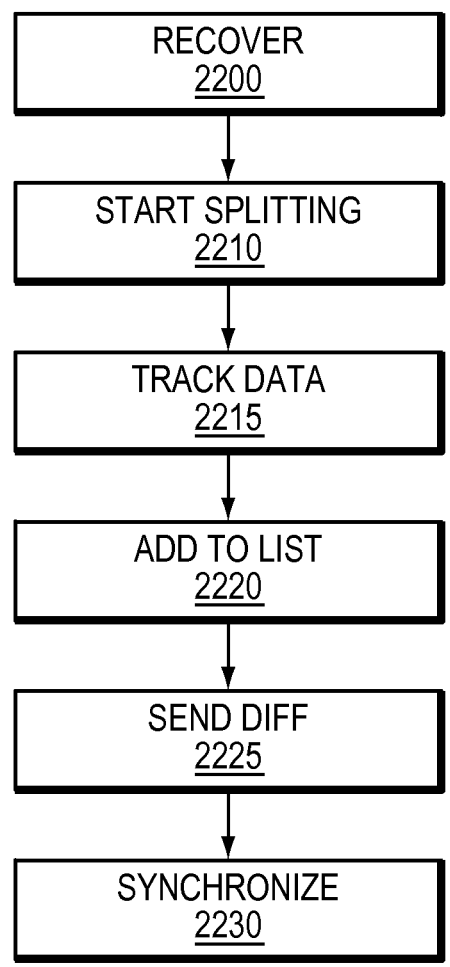
FIG. 22 is a simplified example of a method for a recovery process after a hypervisor crash, in accordance with an embodiment of the present disclosure.

Refer now to the example embodiment of FIG. 22, which describes a recovery process after a hypervisor crash. The hypervisor recovers or the VMs starts running on another hypervisor) (step 2200). The splitter starts splitting data (step 2210). The data is tracked in a first tracking mechanism is read (step 2215). The data is added to a differences list (step 2220). The differences are sent to a DPA (Step 2225). The DPA synchronizes the data (step 2230).

AntiAfinity

In certain embodiments, if snapshots are not used to track changes, it may need to be ensured that the virtual DPAs and filter drivers (splitters or VFAs) run on different machines. In some embodiments, the system may check which appliances replicate data of which volumes and may move CGs to run on different virtual appliances.

In other embodiments, CG may be moved across hypervisors to different appliances to minimize the amount of data which needs resynchronization if a crash were to occur. In certain embodiments, there may be several optimization techniques, such as those resulting from genetic algorithms, genetic programming, or simulated annealing, to find an optimal placement.

Figure 23:
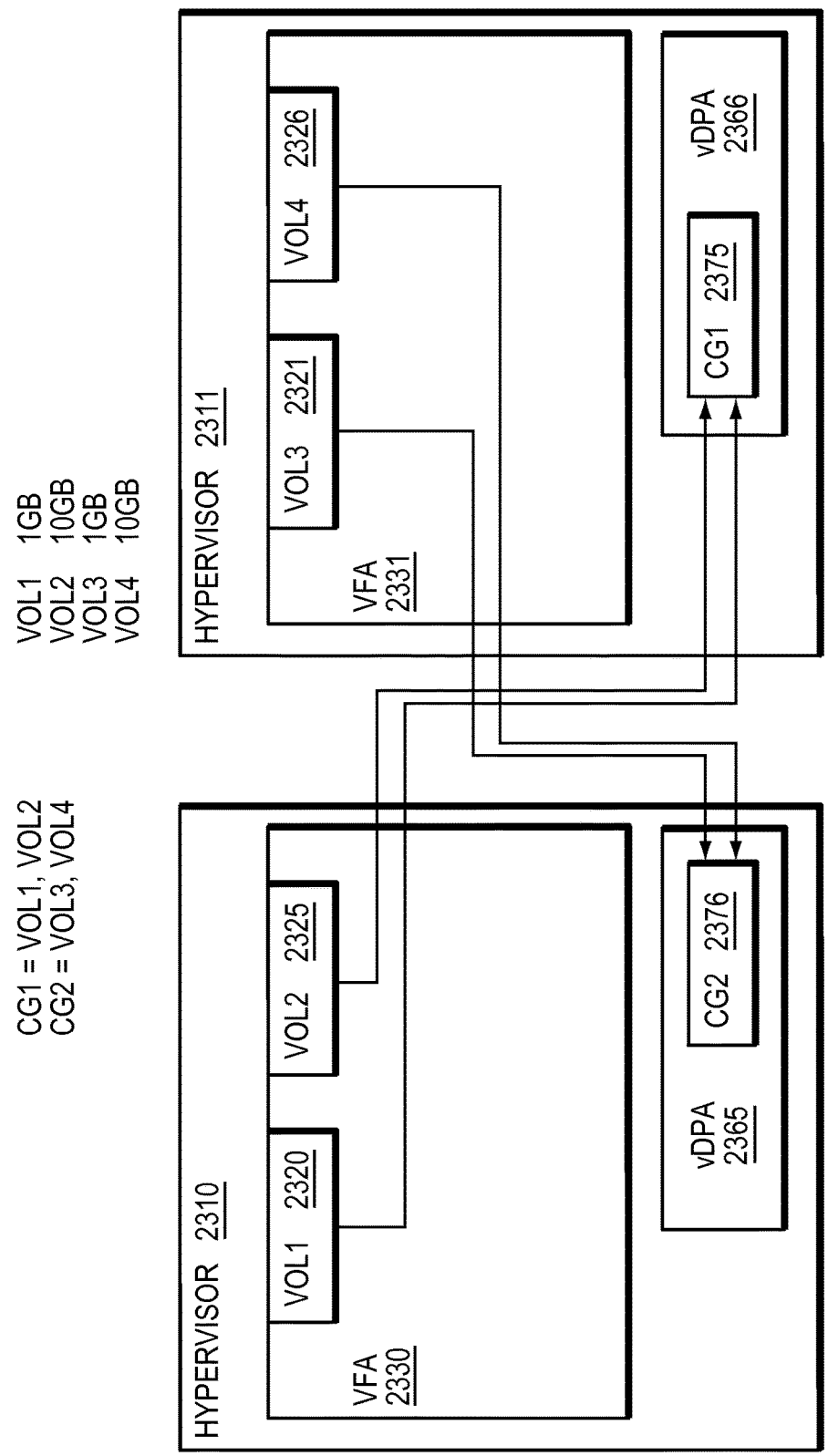
FIG. 23 is a simplified illustration of volumes being replicated to consistency groups, in accordance with an embodiment of the present disclosure.

Refer now to the example embodiment of FIG. 23. In the example embodiment of FIG. 23, there are hypervisors 2310 and 2311. Hypervisor 2310 has VFA 2330 and DPA 2365. Hypervisor 2311 has VFA 2331 and VDPA 2366. VFA has volume 1 2320 and volume 2 2325 which are replicated to CG1 2375 of DPA 2366. VFA 2331 has volume 3 2321 and volume 4 2326 which are replicated to consistency group 2 2376 of DPA 2365.

Figure 24:
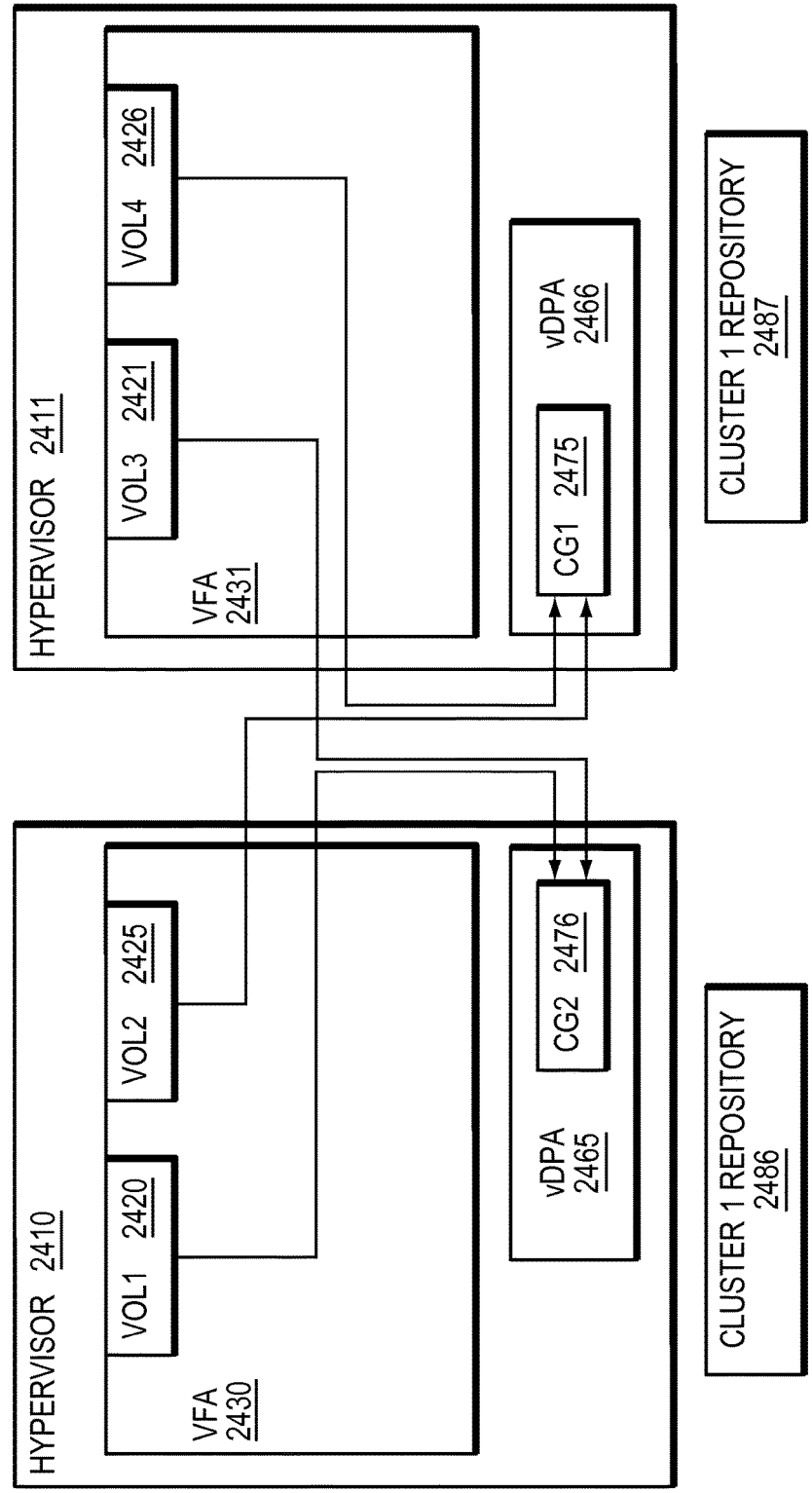
FIG. 24 is a simplified illustration of FIG. 23 after volumes have been moved to different consistency groups, in accordance with an embodiment of the present disclosure.

Refer now to the example embodiment of FIG. 24. In the example embodiment of FIG. 24, there are hypervisors 2410 and 2411. Hypervisor 2410 has VFA 2430 and DPA 2465. Hypervisor 2411 has VFA 2431 and DPA 2466. VFA has volume 1 2420 of size 10 GB and volume 2 2425 of size 100 GB. Volume 2 2425 is replicated to CG1 2475 of DPA 2466. Volume 1 2420 is replicated to consistency group 2 2476 of DPA 2465. VFA 2331 has volume 3 2421 of size 200 GB and volume 4 2426 of size 15 GB. Volume 3 2421 is replicated to consistency group 2 2476 of DPA 2465. Volume 4 2426 is replicated to consistency group 1 2475. This figure shows that in certain embodiments one or more volumes may be replicated by VDPA running on the same hypervisor as the VFA.

In an embodiment, if a hypervisor crashes, for example, hypervisor 2410, vol1 may need to have full resynchronization, but volume 2 2425 may not need full resynchronization, i.e. the system may need to fully resync 10 GB. In this embodiment, If volume 2 2425 was splitting to vDPA 2465, 100 GB would be resynched. Thus in certain embodiments, the optimization algorithm may chose to put CG 2 on vDPA 2465 to minimize the amount of data needing full resynchronization in case of a crash of a hypervisor.

Figure 25:
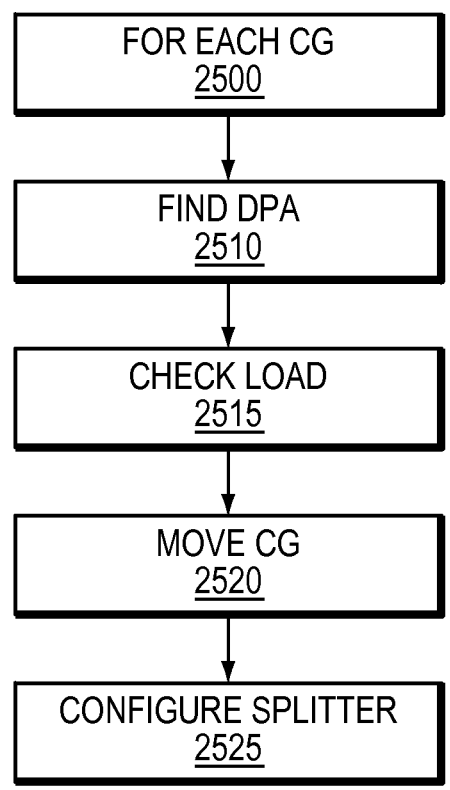
FIG. 25 is a simplified example of a method for moving volumes between consistency groups to minimize the disruption were a hypervisor to crash, in accordance with an embodiment of the present disclosure.

Refer now to the example embodiment of FIG. 25. For each consistency group (step 2500), a minimal disruption amount for each DPA is found i.e. the amount of data to be resynchronization after a hypervisor crash (step 2510). The load of the DPA is checked so after the move no vDPA will have a load which the vDPA cannot replicate (step 2515). The consistency group is moved to a different DPA (step 2520). The splitter is configured to split data to the vDPA to which the consistency group was moved (step 2525).

Figure 26:
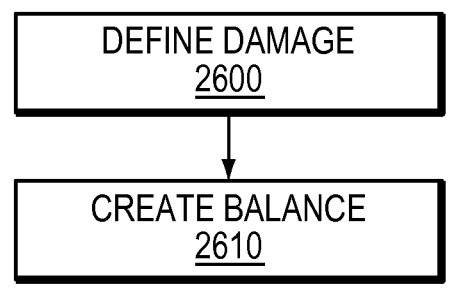
FIG. 26 is a simplified example of a method for determining which volume should be moved based on potential system disruption, in accordance with an embodiment of the present disclosure.

Refer now to the example embodiment of FIG. 26. The amount of damage is defined for the loss of an hypervisor if there is a CG running on the ESX (step 2610). A load balancing optimization algorithm is created (step 2610). Consistency groups are moved to be replicated using the vDPA to minimize damage should a crash occur (step 2620) in a way that no vDPA has too many consistency groups to replicate. The load balance algorithm may use any optimization technique, such as but not limited to simulated annealing, genetic algorithms, genetic programming, and neural networks. In other embodiments, the optimization algorithms may move vDPAs to other hypervisor to minimize the loss of data as well as moving consistency groups between vDPAs.

Asynchronous Splitting

In certain embodiments, each vDPA may run on a different hypervisor. In some embodiments, if the vDPA waits for an acknowledgement before sending an acknowledgement to the host there may be significant delay added to each write. In at least one embodiment, the IOs may be split asynchronously and acknowledged to the VM writing to volumes before sending the IO to the vDPA. In other embodiments, when splitting is asynchronous, a mechanism similar to method described in the section leveraging snapshot is used.

Figure 27:
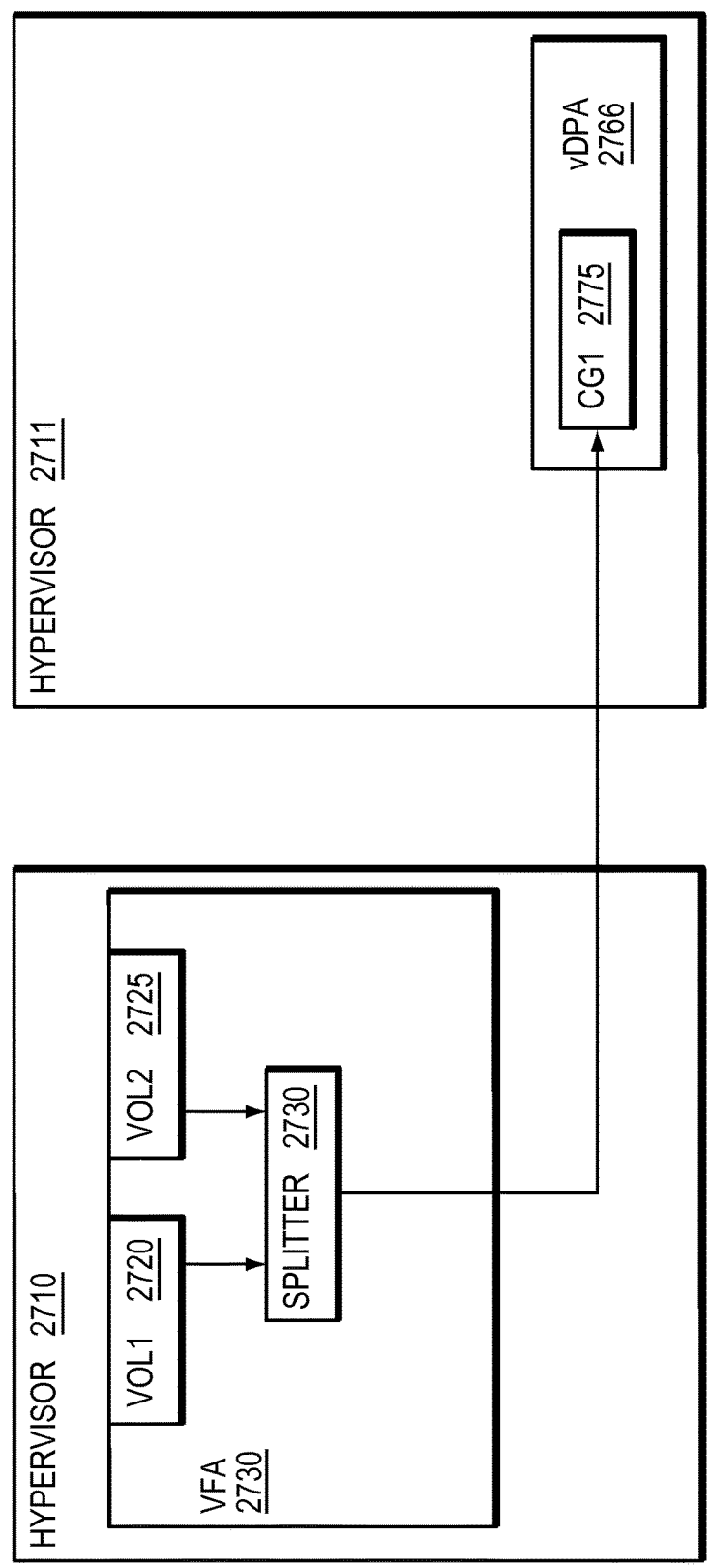
FIG. 27 is a simplified illustration of two volumes on a hypervisor split by a single splitter being replicated to a vDPA on a second hypervisor, in accordance with an embodiment of the present disclosure.
Figure 28:
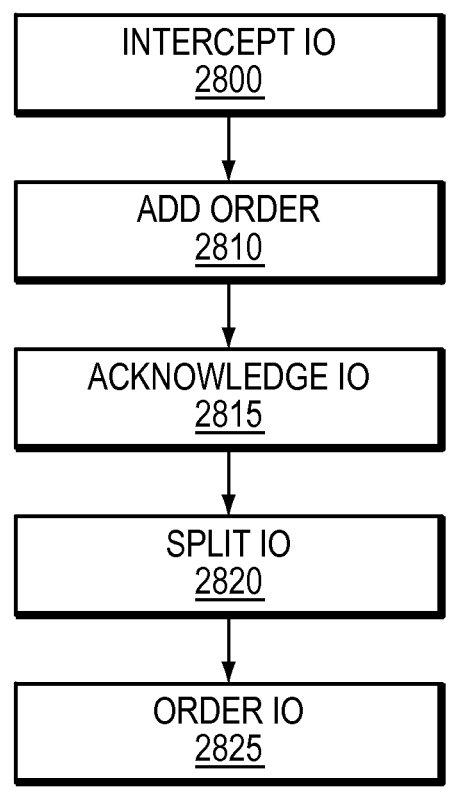
FIG. 28 is a simplified example of a method for ordering split IO, in accordance with an embodiment of the present disclosure.

Refer now to the example embodiment of FIG. 27. In the example embodiment of FIG. 27 there are two hypervisors, 2710 and 2711. Hypervisor 2711 has DPA 2766, which has a consistency group 2775. Hypervisor has VFA 2730, which has Volumes 1 and 2, 2720, 2725 and splitter 2730. Refer now as well to the example embodiment of FIG. 28. Splitter 2730 intercepts IO from one or more of volumes 2720 and 2725 (step 2800). Splitter 2730 adds ordering number to the intercepted IO (step 2810). Splitter 2730 sends IO down the IO stack (step 2815). Splitter 2730 acknowledges the IO being written to the host writing the IO (step 2820). Splitter 2730 sends IO to DPA 2766 with counter in the CDB of the IO (step 2825). DPA 2766 orders the IO (step 2830).

In some embodiments, the DPA may send the IOs to the replica DPA. The IOs in the journal may be ordered to be in the correct order in the journal and may allow any point in time access. In some embodiments, the splitter may use standard SCSI write16 and put the ordering info in the high bits of the offset in the CDB. In other embodiments the splitter may use a vendor specific SCSI command to send IOs to the DPA. In further embodiments, the splitter may send IOs and ordering information to the DPA using a different protocol.

Figure 29:
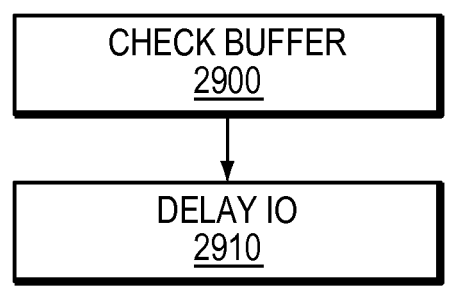
FIG. 29 is a simplified example of a method for delaying IO based on a buffer check, in accordance with an embodiment of the present disclosure.

Refer now as well to FIG. 29. Splitter 2730 checks the size of the buffer for sending IO, i.e. the buffer which contains IOs which where acknowledged to the host but not yet received by the DPA (step 2900). If the buffer of splitter 2730 is full, the splitter delays IO (step 2910), i.e. new IOs arriving are not acknowledged to the hosts. Once space is freed in the buffer, since IOs which were in the buffer may not have reached the RPA, the IOs which were delayed are acknowledged to the hosts and inserted into the buffer for sending to the DPA. If IOs are delayed for a long period (i.e. second), splitter disconnects form the DPA and starts tracking data (step 2920).

Figure 30:
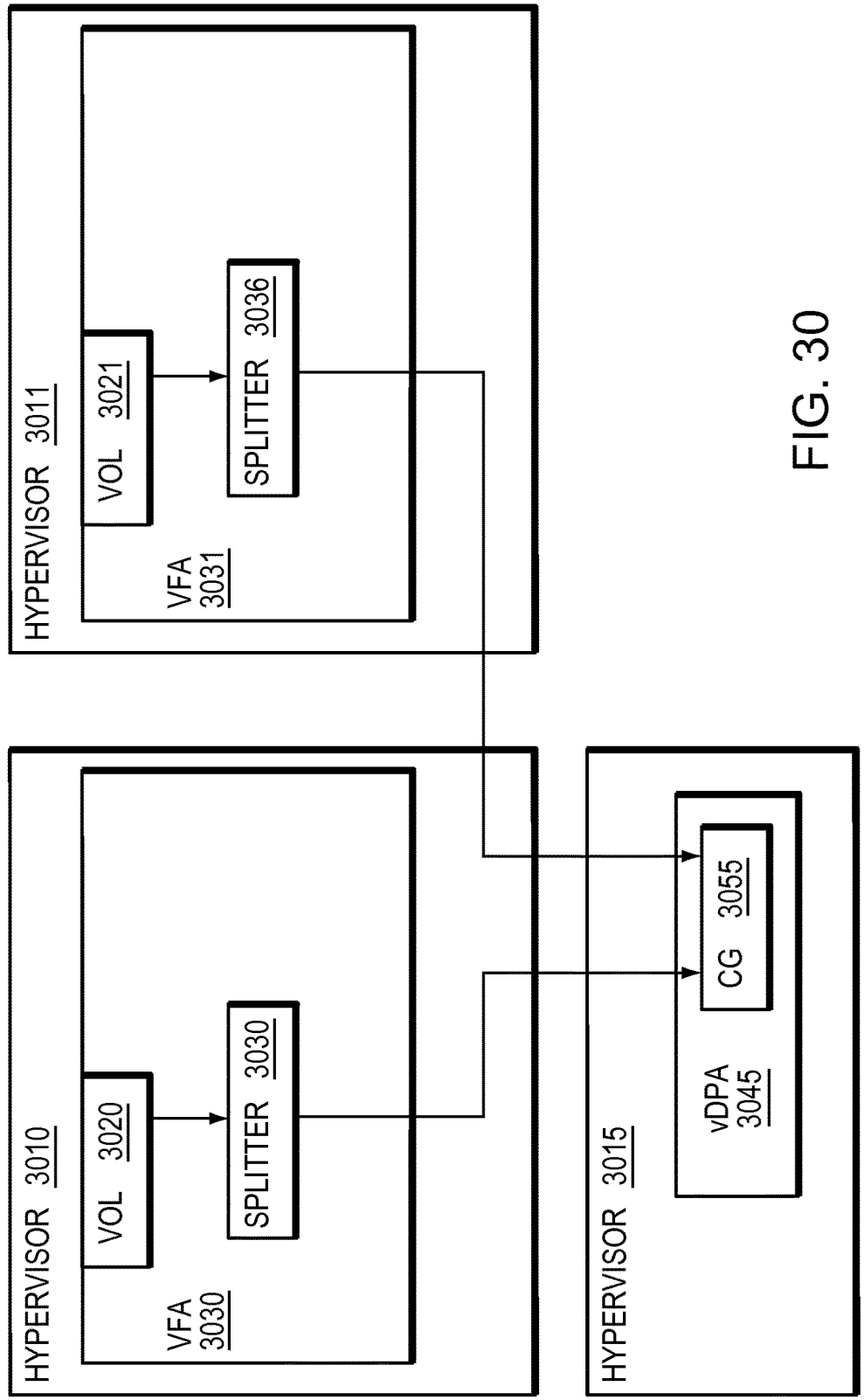
FIG. 30 is a simplified illustration of two volumes on two hypervisor being replicated to a vDPA on a third hypervisor, in accordance with an embodiment of the present disclosure.

Refer now to the example embodiment of FIG. 30. In the example embodiment of FIG. 30, there are three hypervisors, 3010, 3011, and 3015. Hypervisor 3015 has DPA 3045, which has consistency group 3055. Hypervisor 3010 has VFA 3030. VFA 3030 exposes volume 3020, and has splitter 3035 which splits IO arriving to volume 3020 to DPA 3045 to consistency group 3055. Hypervisor 3011 has VFA 3031. VFA 3031 exposes, volume 3021, and has splitter 3036 which splits IO from volume 3021 to DPA 3045 to consistency group 3055.

Figure 31:
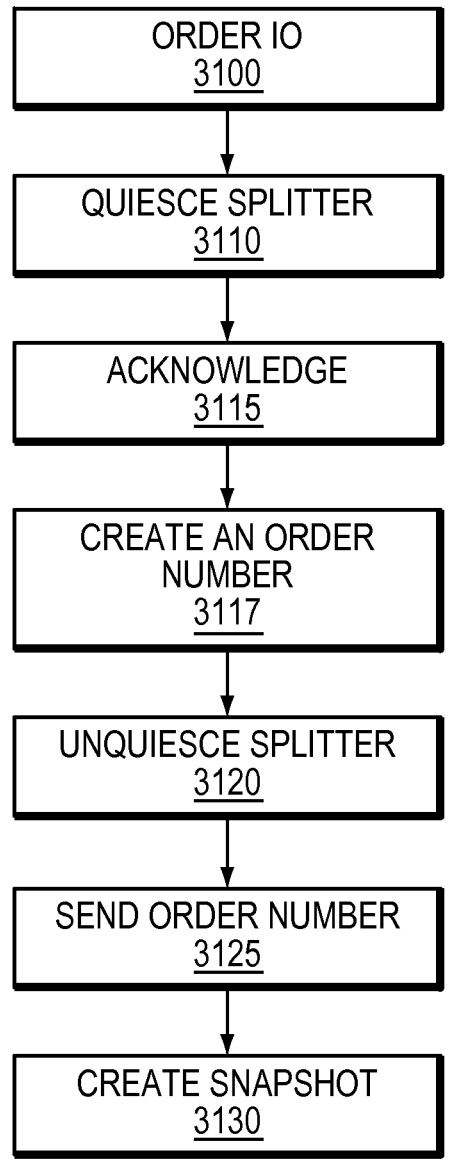
FIG. 31 is a simplified example of a method for taking a consistent snapshot, in accordance with an embodiment of the present disclosure.

Refer now as well to FIG. 31. DPA 3045 orders IO from splitter 3935 and splitter 3036 (step 3100). DPA 3045 periodically quieses splitters 3035 and 3036 with an ID (Step 3110). Splitter 3035 and 3036 acknowledge the quiesce command (step 3115). A quiesce order number is created for the quiesed period (step 3117), during the queise period the splitter does not acknowledge IOs, and IOs are delayed.

DPA 3045 unquiesces splitters 3035 and 3036 (step 3120). Splitters 3035 and 3036 send DPA 3045 an order numbered associated with the ID transmitted by DPA 3045 (step 3125). Once the data arrives from the splitter until the time of the quiesce order number. DPA 3045 creates a snapshot at a consistent point in time (step 3130).

Figure 32:
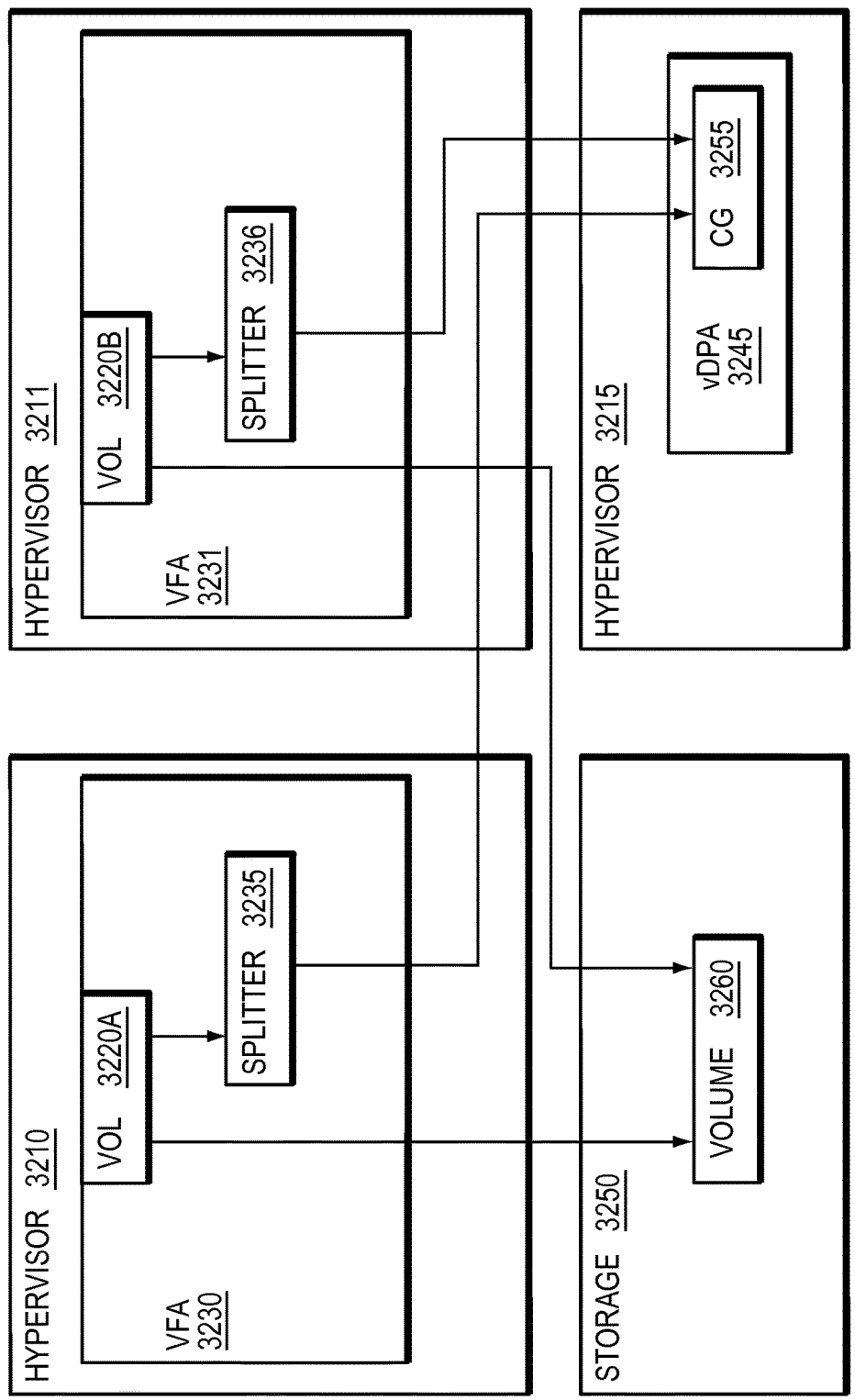
FIG. 32 is a simplified illustration of two hypervisors exposing the same volume, in accordance with an embodiment of the present disclosure.

Refer now to the example embodiment of FIG. 32. In the example embodiment of FIG. 32, there are three hypervisors, 3210, 3211, 3215, and storage 3250. Hypervisors 3210 and 3211, have VFAs 3230 and 3231, respectively. Each VFA exposes the same physical volume, volumes 3220A and 3220B (the volume exposed by both VFAs is the same volume), respectively, and has a splitter, splitter 3235 and 3236 respectively. Hypervisor 3215 has DPA 3245. Storage 3250 may expose volume 3260, which serve as a backend to the volume exposed by VFAs 3230 and 3231. DPA 3245 has consistency group 3255.

Figure 33:
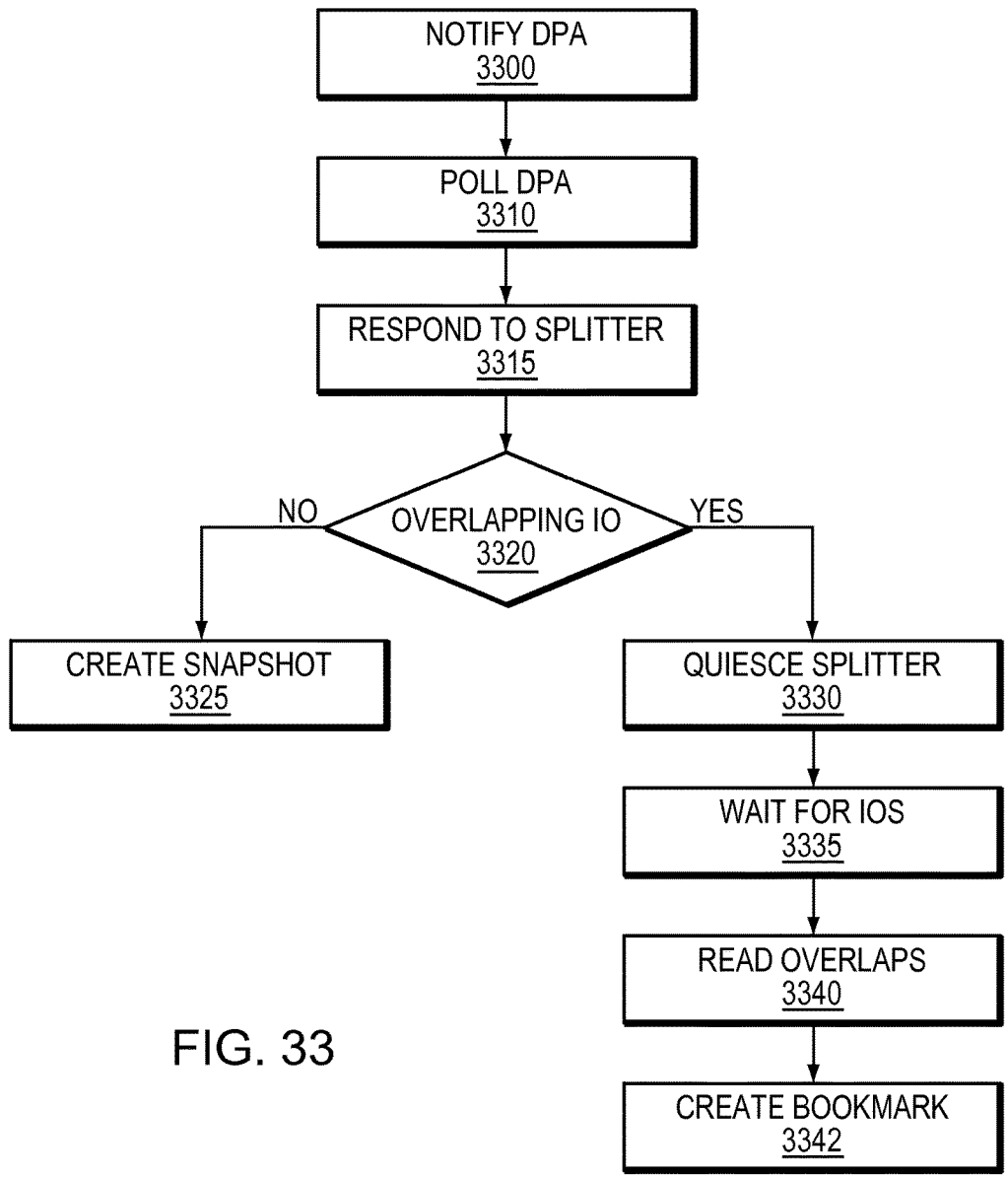
FIG. 33 is a simplified example of a method for taking a consistent snapshot when the same volume is exposed by two hypervisors, in accordance with an embodiment of the present disclosure.

Refer now as well to the example embodiment of FIG. 33. The DPA 3245 is notified that a bookmark is to occur (step 3300). The DPA 3245 creates a bookmark as described in FIG. 31. When bookmark data arrives, a check is performed to see if there is overlapping IOs from splitters 3235 and 3236 (step 3320). If there is no overlapping IO, a bookmark is created (step 3325) (the bookmark may be created in the same manner a bookmark is created in FIG. 31). If there is overlapping data, the splitters 2335 and 2336 are quiesced (step 3330). DPA 3245 waits for the IOs outstanding to arrive (step 3335). DPA 3245 reads the overlaps that arrived from splitters 3235 and 3236 from the disk (i.e. from volume 3220) (step 3340). A Bookmark is created (Step 3442).

Volume Hot Migration (i.e. Storage Vmotion)

In some embodiments, a system may move a replicated volume to another storage unit or another volume in the same storage array. In certain embodiments, the process of moving a replicated logical unit from one storage to another may be non disruptive to the applications using the volume. In other embodiments, moving a replicated logical unit may be disruptive to the replication process if the volume migrated is being replicated.

Refer now to the example embodiment of FIG. 34a, which illustrates a replication system before storage motion, and FIG. 34b which illustrates a replication system after storage motion. Hypervisor 3410 is located at a production site and hypervisor 3415 is located at a replication site. Volume 3420 is being replicated to volume 3460 at the replica site. In FIG. 34a, volume 3420 is going to be replaced by volume 3421, 3436 splitter is not originally splitting volume 3421. During the process of notifying the vDPA of the storage vmotion, the vDPA notifies the splitter to start splitting volume 3421 and identifies volume 3421 with volume 3420.

Configuration of an application to use to use volume 3421 instead of 3420 is performed in a non-disruptive manner in this embodiment by storage vmotion, which copies data from volume 3420 to volume 3421 while application is running and when the data is copied transparently move application to work on volume 3421. In certain embodiments, volume 3421 may be exposed by VFA 3420. In certain embodiments, storage vmotion may be replaced by another method of moving the volume. In further embodiments, the VFA and vDPA may run on different hypervisors (i.e. each may run on another hypervisor independently). In other embodiments, the splitter may intercept IOs at the hypervisor kernel and not in a virtualization layer.

Figures 35A, 35B:
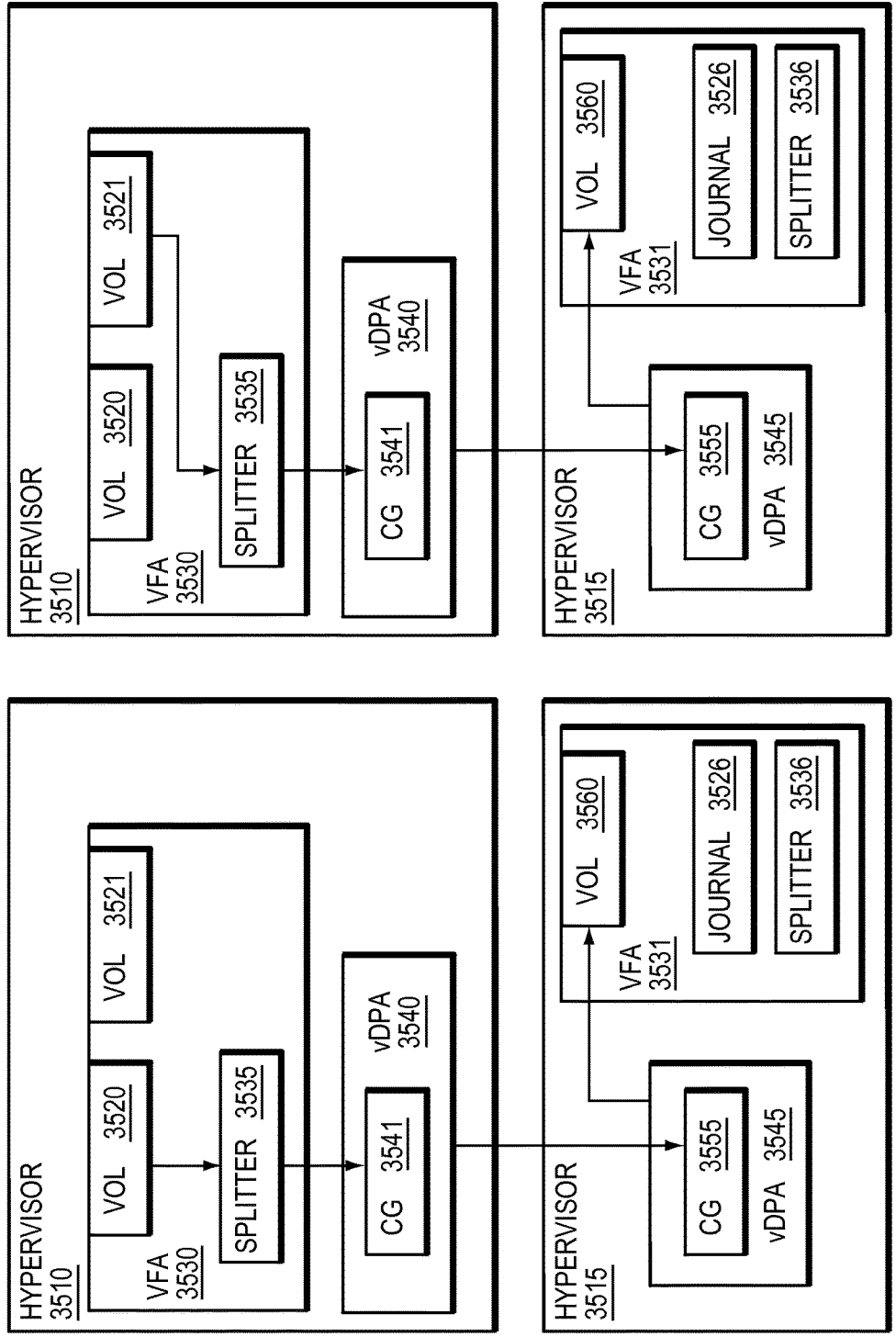
FIG. 35a is a simplified illustration of a source and target volume exposed by the same VFA before storage motion, in accordance with an embodiment of the present disclosure.
FIG. 35b is a simplified illustration of a source and target volume exposed by the same VFA after storage motion, in accordance with an embodiment of the present disclosure.
Figure 36:
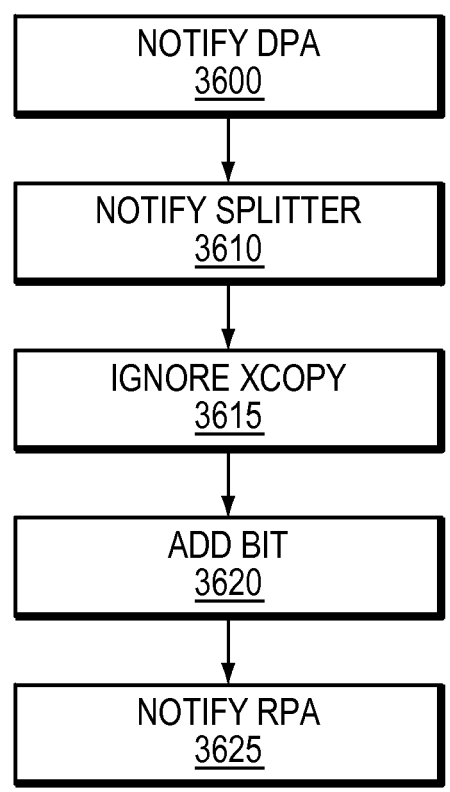
FIG. 36 is a simplified example of a method for storage motion, in accordance with an embodiment of the present disclosure.

Refer now to the example embodiment of FIGS. 35a and 35b, which illustrate storage migration in the case there the source and target volume of the volume migration are exposed by the same VFA. In the example embodiment of FIG. 35, there are two hypervisors, 3510 and 3515. Hypervisor 3510 is local and hypervisor 3515 is remote.

FIG. 35a describes the system before the volume migration and system 35b describes the system after the volume migration. In the case where both target and source VVOL are exposed by the same VFA or in the case where the splitter is in the hypervisor kernel, and both source and target volume for migration run on the same storage array, the storage migration process may use copy acceleration commands like xcopy which reduce the amount of data needed to transfer during the volume migration.

Refer now to the example embodiments of FIGS. 34a, 34b, 35a, 35b and 36, where FIGS. 34a and 35b illustrate a system before and after storage vmotion for an embodiment where the volumes are either on a different storage array or exposed by different VFAs. FIGS. 35a and 35b illustrate a before and after storage vmotion in an embodiment where the source and target volume are in the same storage arrays or in the case of VFA source and target VVOLs are exposed by same VFAs. Hypervisor 3510 (3410) notifies vDPA 3540 (3440) that there is a storage migration (in an embodiment where hypervisor is an ESX the migration may be storage vmotion) i.e. source, volume 3520 (3420), is to be migrated, to a target, volume 3521(3421) (step 3600). vDPA 3540 notifies splitter 3535 (3436, in the case where there are separate VFA the splitter for volume 3421 is different than the splitter for volume 3420, in an embodiment where both volume are exposed by the same VFA splitter 3535 splits both volumes 3520, 3521) to split IOs going to volume 3521(3420), splitter 3535(3435) continues splitting IOs to volume 3520(3420). The vDPA is configured to identify volume 3520(3420) and volume 3521(3420) as the same volume as being in the same consistency group 3541 as the same volume (step 3610). vDPA 3540 will ignore an xcopy command used by migration process to shift the data of volume 3520 to volume 3521 and the command will be sent to the back-end storage 3560 (step 3615) (this may occur in an embodiment where volumes 3520 and 3521 are served by the same backend storage and by the same VFA).

In some embodiments, if the storage vmotion process is done from one storage array to another storage array or the storage array does not support xcopy command or virtual volume VVOLs may be exposed by different VFAs, the xcopy command may not be used. In further embodiments, in the storage vmotion process copying may be done by reading data from one volume and writing it to the second volume. In an embodiment, a special bit may be added to the CDB of the writes to the new volume to indicate that the IO is a write created by the copying mechanism, the indication bit may be added to the storage vmotion process or another migration process. In the embodiment of FIG. 35a, 35b, 34a, 34b, splitter 3435(3436) ignores the IO with a special indication and not split it to the DPA (step 3620), as the replica volume has the data being copied. DPA 3540 (3440) may be notified that the migration copying has completed and that DPA 3540 (3440) notifies splitter stop splitting from volume 3520 (step 3625), volume 3520 is removed from the configuration of CG 3555(3455).

Replication of Snapshots

In certain embodiments, a snapshot for a VVOL may be created in a virtual environment. In some embodiments, the snapshot may be created at the replica site. In other embodiments, the snapshot may be writable and the snapshot may be created at the replica and changes to the snapshot may be replicated to the replica site as well.

Figure 37B:
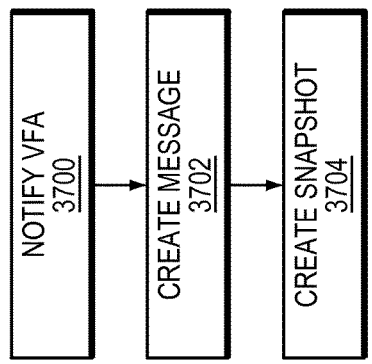
FIG. 37b is a simplified example of a method for replicating a snapshot command at replication site, in accordance with an embodiment of the present disclosure.
Figure 37A:
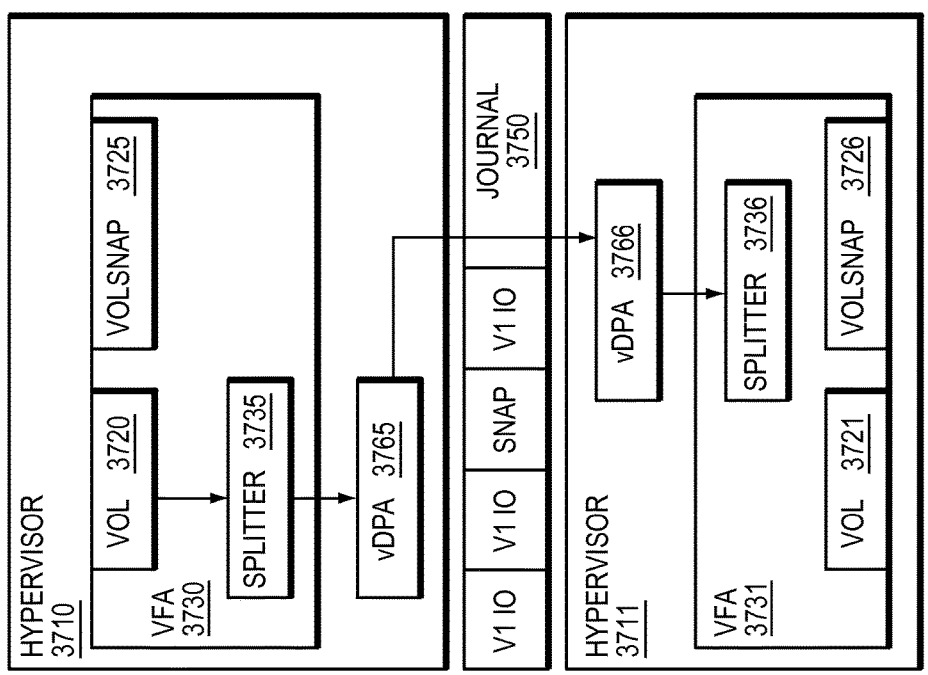
FIG. 37a is a simplified illustration a snapshot being taken on a production site and replicating the command at the replication site, in accordance with an embodiment of the present disclosure.

Refer now to the example embodiment of FIGS. 37a and 37b. In the example embodiment of FIG. 37 a snapshot is created and replicated. There are two hypervisors, hypervisor 3710 at the production site and hypervisor 3711 at the replication site, and journal 3750 at the replica site. Splitter 3735 of VFA 3730 intercepts IOs to volume 3720 and splits them to vDPA 3765. Hypervisor 3710 has VFA 3730 and vDPA 3765. VFA 3730 has volume 3720 and user or system created volume snap 3725. Volume 3720 is replicated to vDPA 3765. vDPA 3765 is replicating IOs to vDPA 3766 of Hypervisor 3711.

VFA 3730 is notified to create a snapshot of the volume through VASA API (step 3700). In a first embodiment, the creation of a snapshot may be created in two phases by preparing a snapshot and creating the snapshot. In a second embodiment, the snapshot may be created by directly creating the snapshot in one phase. When snapshot is created a message of snapshot creation is created in the journal at the replica site (step 3702). As the data is applied from the journal at the replica site to the replica volume 3721 the message create at step 3702 is read by vDPA 3766 and snapshot 3726 is created at the replica site (step 3704).

Figure 38:
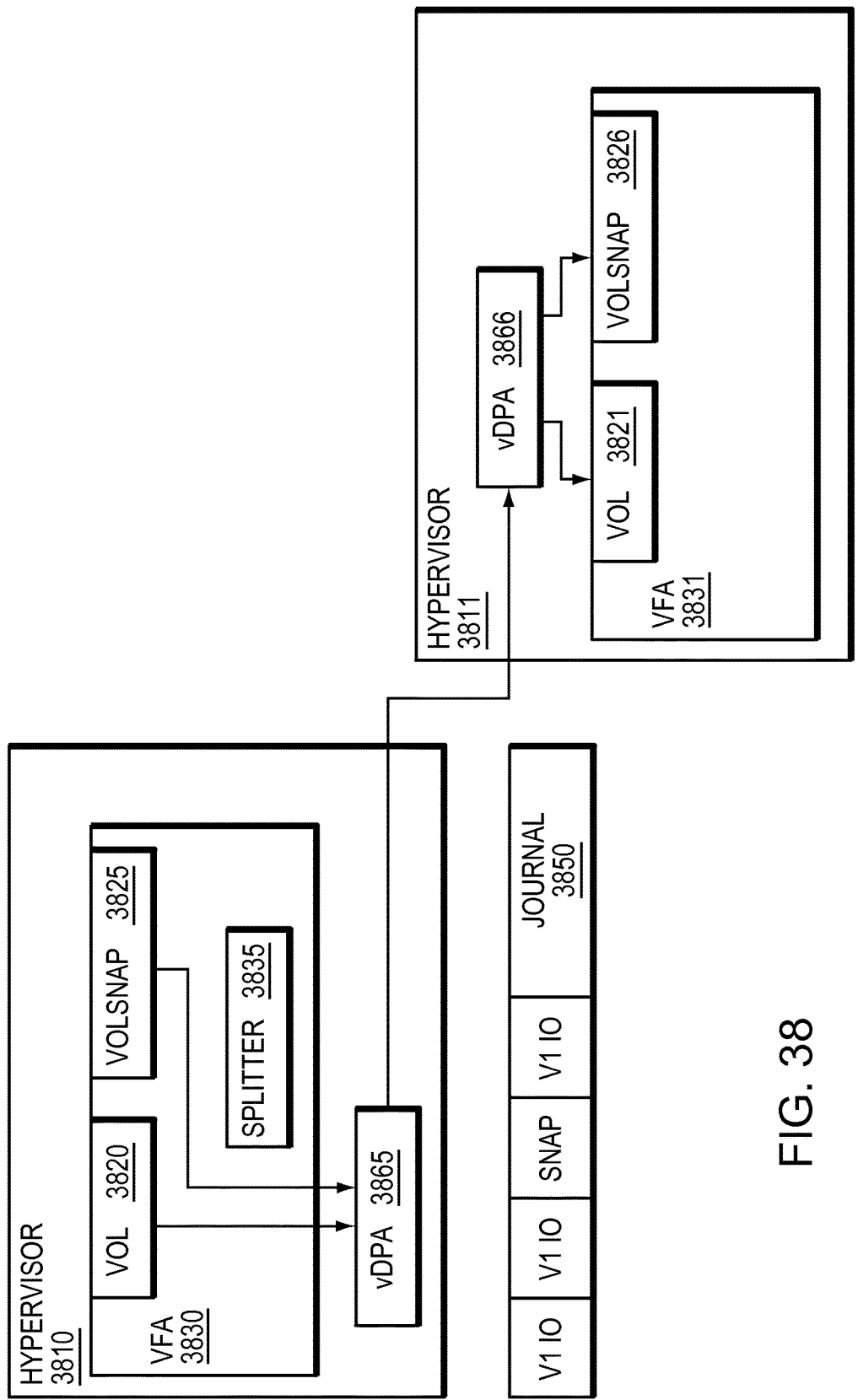
FIG. 38 is an alternative simplified illustration a snapshot being taken on a production site and replicating the command at the replication site, in accordance with an embodiment of the present disclosure.
Figure 39:
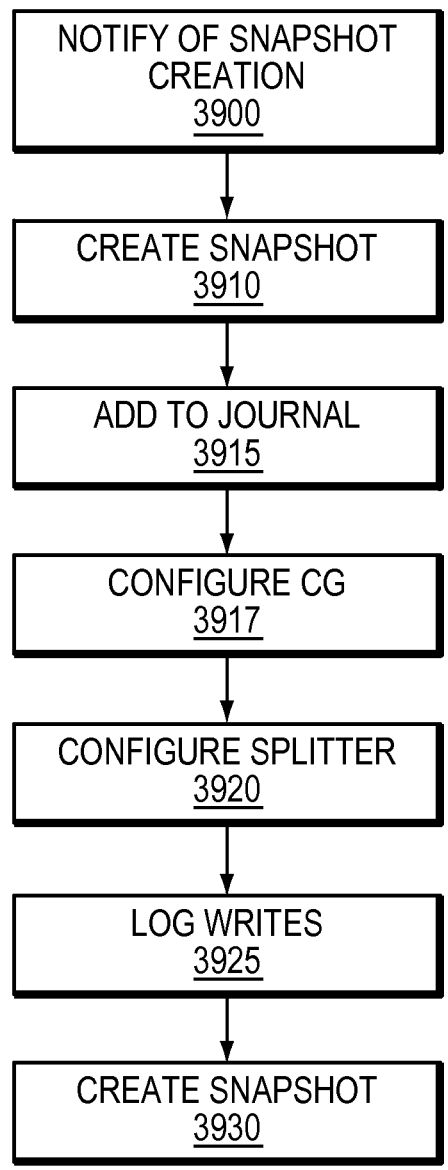
FIG. 39 is an alternative simplified example of a method for replicating a snapshot command at replication site, in accordance with an embodiment of the present disclosure.

Refer now to the example embodiments of FIGS. 38 and 39. In the example embodiment of FIG. 38, there are two hypervisors 3810 and 3811. Hypervisor 3810 at the production site has VFA 3830 and vDPA 3865 and splitter 3835. VFA 3830 has volume 3820, volume snap 3825 is created using a VASA API to create snapshot, in this embodiment the snapshot created is a writable snap and the snapshot and changes to the snapshot need to be replicated to the replica site.

Hypervisor 3811 at the replica has vDPA 366 and VFA 3831. VFA 3831 has volume 3821 which is a replica volume for volume 3820 and the replication process creates volume snap 3826, which is a replica of volume snap 3825 at the production site. There is also journal 3850 used be the data protection appliance to allow any point in time access to the replicated volume.

A user may want to create a snapshot of volume 3820. VFA 3830 is notified to create a snapshot of the volume 3820 through an interface such as VMW's VASA interface (step 3900). In a first embodiment, the creation of the snapshot may be done in two phases, preparing a snapshot and then creating the snapshot. In a second embodiment, the creation of a snapshot may be done in one phase (step 3910). When snapshot 3825 is created a message of snapshot creation is added to journal 3850 at the replica site (step 3915). The consistency group replicating volume 3820 is configured to be replicating volume snapshot 3825 (step 3917).

Splitter 3735 at hypervisor 3710 is configured to start splitting IOs arriving to snapshot 3825 (step 3920). The writes to snapshot 3825 are also logged in the journal at the replica site (step 3925). Once the message of snapshot 3825 created is applied from the replica journal to volume 3721 snapshot 3826 is created at the replica site. In an embodiment with two phase snapshot creation, the remote snapshot volume may be created at the replica once the prepare snapshot command is called, but the snapshot may be available when the data up to the snapshot point in time is applied to the replica. In certain embodiments, after the snapshot is created at the replica, new IOs that arrived to the snapshot volume at the production site may be applied to the snapshot created at the replica site. In other embodiments, if the snapshot is created at one phase, the replica snapshot volume may not exist when the production snapshot is created and the consistency group may be configured to replicate the production snapshot to a volume which does not exist yet.

Moving a Volume from One Consistency Group to Another

In some embodiments, the number of supported replicated virtual machines may be much larger than the number of consistency groups. In certain embodiments, this may be because some VMs may share the same consistency groups. In an embodiment, if a VM profile is changed, the CG of the VM may need to be changed. In particular embodiments, there may be disruption to the replication and loss of journals. In other embodiments, the current disclosure may enable volumes to be moved (and VM to be moved) from one CG to another without major disruption to the replication Refer now to the example embodiments of FIGS. 40a, 40b, which illustrate an embodiment where there is a volume 4021 replicated in one consistency group CG1, moved to be replicated by another consistency group CG2, while another volume 4020 remains replicated by CG1. In the example embodiment of FIG. 40a, there is a hypervisor 4010 running VFA 4030, vDPA 4040 and vDPA 4041. VFA 4030 has splitter 4035, volume 4020, and volume 4021. Volumes 4020 and 4021 are replicated through splitter 4035 to consistency group 4075 on vDPA 4040. Volume 4021 is to be moved to be replicated to consistency group 2 4076 on vDPA 4041. Refer now to the example embodiment of FIG. 40b. Here, volume 4021 is replicated through splitter 4035 to consistency group 2 4076 on vDPA 4041.

Figure 42:
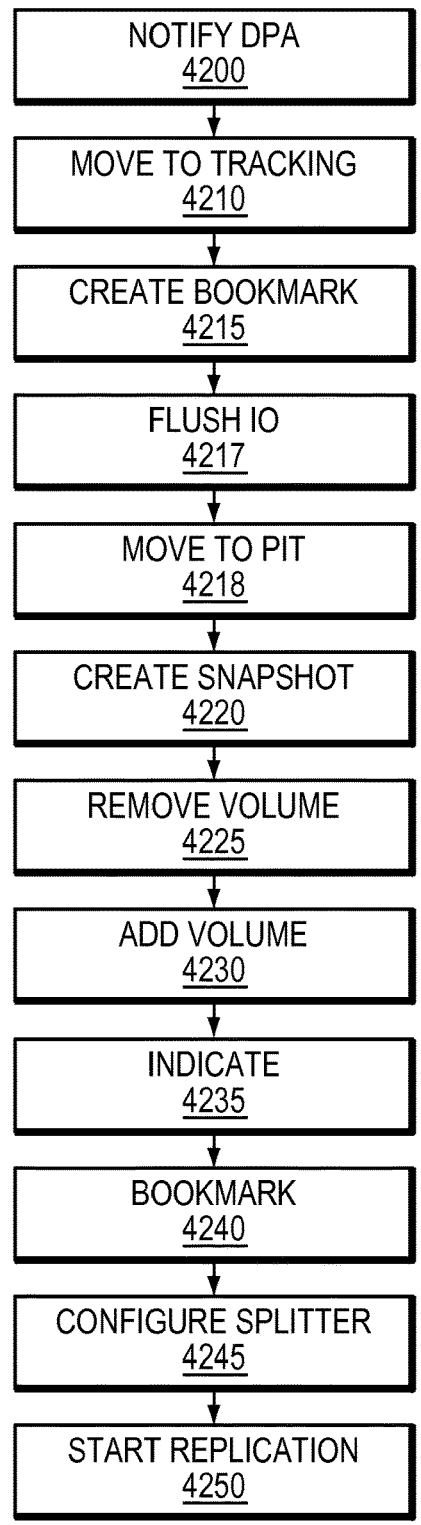
FIG. 42 is a simplified example of a method for moving a volume from being replicated by a first consistency group to a second consistency group, in accordance with an embodiment of the present disclosure.

Refer now to the example embodiments of FIGS. 41a and 41b, which illustrate moving a volume from one consistency group to another where the volume is exposed by a different VFA. In 41a, hypervisor 41010 has VFA 4130, VFA 4131, vDPA 4140, and vDPA 4141. VFA 4130 has volume 4120 which is replicated to consistency group 4175 of vDPA 4140. VFA 4131 has volume 4121 which is replicated to consistency group 1 4175 on vDPA 4140. The example embodiment of FIG. 41b shows how volume 4121 of VFA 4131 is moved to be replicated in CG2 4175 on vDPA 4141. In other embodiments, each VFA and each vDPA may run on the same hypervior, such as illustrated in FIGS. 40 and 41 on different hypervisors, independently. For example in the embodiment of FIG. 40, VFA 4030,4031 may each run on a different hypervisor. In the example embodiment of FIG. 40, vDPA 4140 and 4141 may run on different hypervisors. Refer now to FIG. 42.

The vDPA is notified volume is to move from CG A to CG B (which may run in different appliances (step 4200). Splitter is moved to tracking mode for the volume which is moving to another CG (step 4210). A Bookmark is created for CG A indicating the volume is removed (step 4215. IOs prior to the splitter moving to tracking mode are flushed at the replica site (step 4217). The replica of the consistency group having a volume removed is moved to the point in time that the volume is removed (step 4218). If user indicated the ability to access a previous point in time of the removed volume from CG A, a snapshot of the volume is created at the replica and is kept with the configuration of CG A (step 4220). The Volume is removed from CG A (step 4225).

The Volume is added to CG B, both source and target of the volume are added (step 4230). A bookmark indicating the addition of the volume to CG B is created in CG B (step 4240). The splitter is configured to split IOs to CG B (step 4245). CG B starts replicating the new volume, reads the changes tracked in the splitter and send the changes to the replica volume (step 4250). In some embodiments, as the volumes are being moved IO may continue to arrive to the volume, these IO may be the only data that is out of synchronization.

In some embodiments, if a user wants to move back in time for the consistency group that contained the volume that was removed, and the point in time is before the volume was removed and user indicated to keep the snapshot of the volume then the CG A rolls back the data from the journal to the snapshot created.

Figure 43:
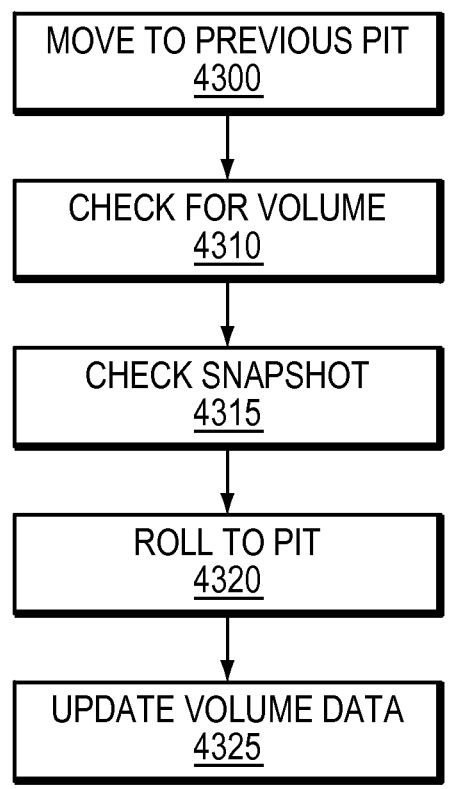
FIG. 43 is a simplified example of a method for rolling to a point in time, in accordance with an embodiment of the present disclosure.

Refer now to the example embodiment of FIG. 43. An image is moved to a previous point in time (PIT) in the consistency group with the removed volume (step 4300).

The PIT is checked to see if it contains the removed volume (step 4310). A check is performed to see if the snapshot was created for the remove volume (step 4315). The image is rolled to the PIT (step 4320). The volume data in the snapshot is exposed as a version of the volume and new IOs arrive to the snapshot (step 4325).

In other embodiments, if no snapshot was created when CG A rolls to a point in time prior to the snapshot, the data for the removed volume is ignored. In other embodiments, if a snapshot was created for the deleted volume, the snapshot is deleted and removed from CG A configuration when the bookmark is created for indicating the deletion of the volume is deleted from the journal (as the journal has limited space older entries are deleted from the journal as new date arrives).

Moving a CG from Cluster to Another Cluster

In some embodiments, a replication cluster may be a set of virtual or physical DPAs which replicate a set of consistency groups; the cluster may have one or more nodes. In certain embodiments, the nodes may be used for availability. In at least one embodiment, if a node crashes another node may take the activities of the failed node. In further embodiments, the nodes may provide additional performance by supporting more CPU power and more resources.

In some embodiments, the ability to resume replication once a node fails may need to be instantaneous. In certain embodiments, the cluster nodes may know the states of the other cluster nodes and the states of the volume being replicated, as well as the available paths in the SAN to all replicated volume. In other embodiments, the knowledge of the states may limit the maximum scale of a cluster to tens of thousands of volumes and limited amount of nodes. In further embodiments, as the scale of virtualized environment might be higher, multiple replication clusters may co-exist in one virtual environment to scale out the environment. In some embodiments, the current disclosure enables a consistency group to be moved from one replication cluster to another with minimal disruption.

Refer now to the example embodiment of FIG. 44*a*. FIG. 44*a* shows has 4 hypervisors, 4410, 4481, 4482, and 4483. Hypervisor 4481 has two consistency groups, cg1 4475 and cg2 4477 on vDPA 4440, which make up a first cluster. Consistency group 1 4475 will be moved to cluster 2 running on hypevisors 4483,4482, specifically the in FIG. 44*b*, in this example embodiment, after the move the CG will run as a new CG on vDPA 4441 which is running on hypervisor 4483. Hypervisor 4483 has vDPA 4441 and is part of cluster 2. Hypervisor 4482 also has vDPA 4442 which is part of cluster 2.

Refer now as well to the example embodiment of FIG. 44*b*, which illustrates consistency group 1 4477 which runs on cluster 1. Consistency group 4476 is a consistency group in cluster 2. Consistency group 4476 has the same properties and volumes as consistency group 4475 which was erased from cluster 1. Consistency group 4476 is replicated by cluster 2 and runs on vDPA 4441. If vDPA 4441 were to fail consistency group 4476 may cause CG 4476 to run on vDPA 4442, which is part of the same replication cluster.

Figure 45:
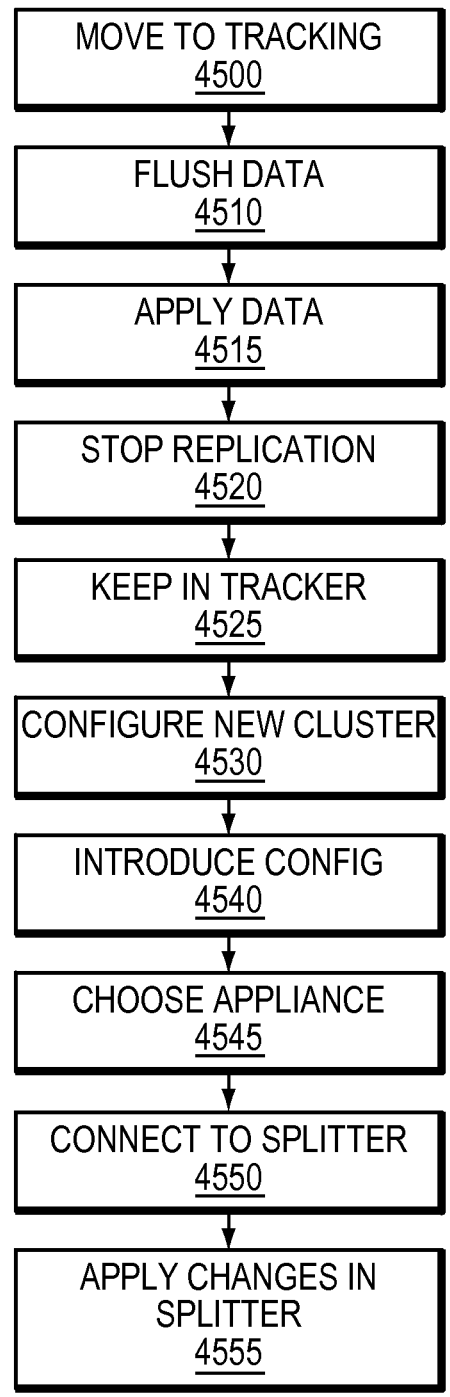
FIG. 45 is a simplified example of a method for moving a volume from being replicated by a first data protection appliance to a second data protection appliance while still remaining in the same consistency group, in accordance with an embodiment of the present disclosure.

Refer now as well to the example embodiment of FIG. 45 which illustrates an embodiment of a method to move the system of FIG. 44*a* to that of 44*b*. Splitter 4435 is moved to tracking mode (step 4500) for the volumes of the CG to be moved. The data is flushed to the replica site, i.e. the data which is in the replication appliance memory is sent to the replica appliance (step 4510). The data is applied at the replica site, i.e. the data that arrived from the production appliance to the replica appliance is written to the replica journal (step 4515). The replication is stopped (step 4520). Splitter 4435 is in tracking mode and notified that consistency group 4475 is being moved (step 4525) to another cluster (cluster 2). Splitter 4435 is configured to discover and talk to second replication cluster (step 4530).

The new cluster is configured with a new consistency group, the consistency group has the same volumes and the same journals as the original consistency group had (step 4540). The consistency group is created in a special mode indicated this is a CG that moved from another cluster, so the volume may not need to be resynchronized.

Virtual appliance 4471 is chosen to run the consistency group (cg 4476) is chosen (4545). Splitter communicated with the appliance running the new CG (step 4550). Splitter 4436 send changes tracked in tracking mode to the appliance replicating the consistency group (Step 4555). FIG. 44*b* represents the location of volume 4420 after the move to second replication cluster. In this embodiment, the VFA did not change and the cluster running the appliance did change. In certain embodiments, the techniques exemplified in FIGS. 44*a*, 44*b*, and 45 may run from an external tool as there may not be communication between appliances.

VFA Statistics

In certain embodiments, it may be important to know how many splitters and recovery appliances are necessary to give an amount of data. In certain embodiments, this may including determining how much bandwidth is needed in a system. In certain embodiments, it may be necessary to know how much CPU power is needed. In other embodiments, it may be necessary to know how much the data may be compressed.

Figure 46:
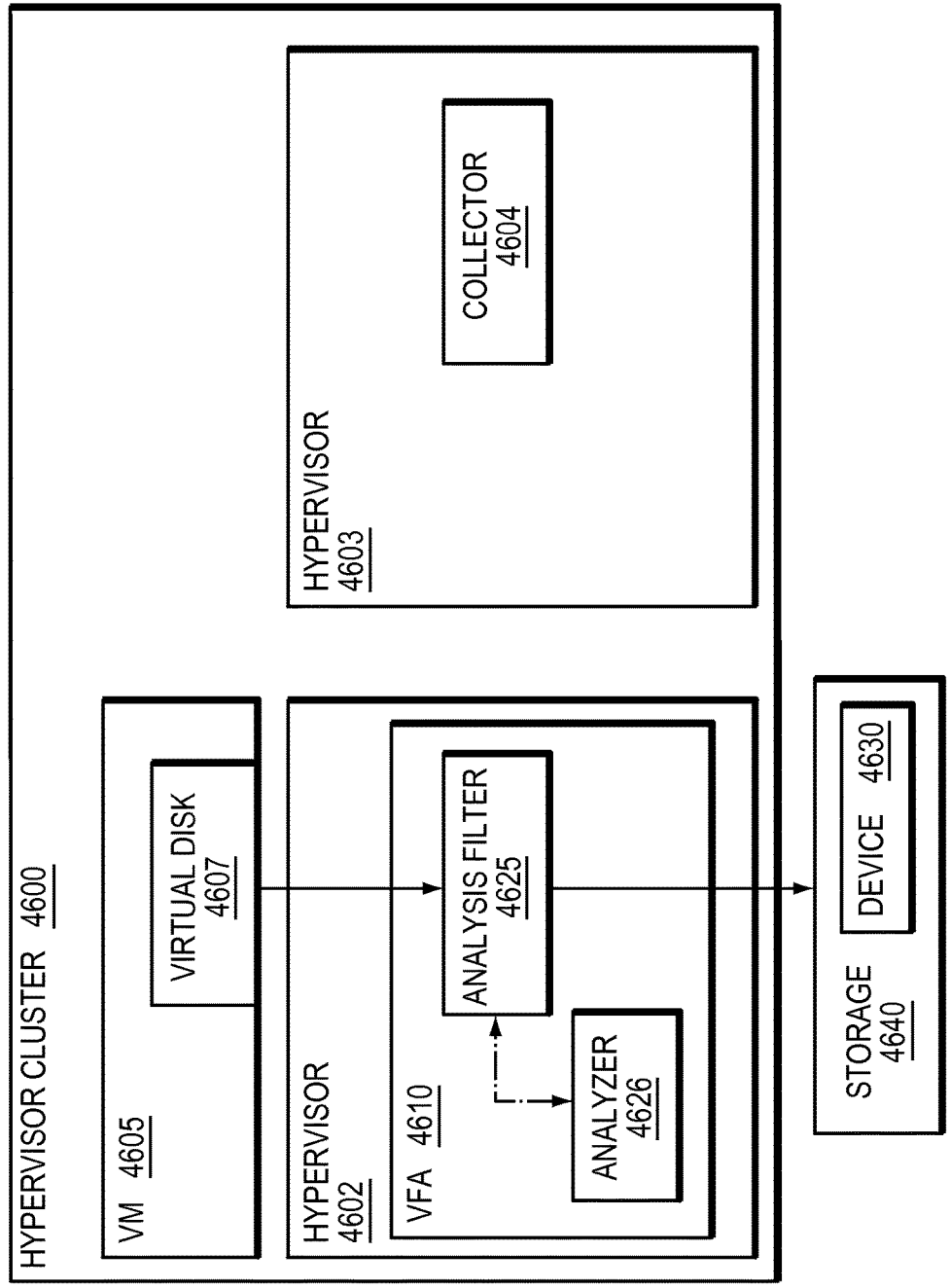
FIG. 46 is a simplified illustration of an analysis filter running on a hypervisor, in accordance with an embodiment of the present disclosure.
Figure 47:
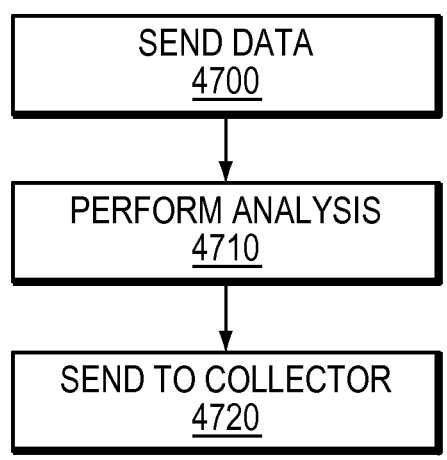
FIG. 47 is a simplified example of a method for performing analysis on IO, in accordance with an embodiment of the present disclosure.

Refer now to the example embodiment of FIG. 46. In the example embodiment of FIG. 46, there is hypervisor cluster 4600. Hypervisor Cluster 4600 has hypervisor 4602 which has VM 4605, and VFA 4610 running as virtual machines, and storage 4640. VM 4605 has virtual disk 4607. Hypervisor cluster 4600 also has hypervisor 4603, which has collector 4604. Writes to virtual disk 4607 go to VFA 4610 on hypervisor 4602. VFA 4610 has an analysis filter driver 4625. IOs are sent through analysis filter 4625 to storage 4640 and are stored on device 4630, i.e. the filter is a path through filter.

As IOs are sent to VFA 4610, analysis filter 4625 may send the IO data to analyzer 4626 performs calculations on the IOs (step 4700). Analyzer performs analysis of the data (step 4710). Analyzer sends analysis information Collector 4604 (step 4720).

In certain embodiments, VFA may record the number of IOs and how much bandwidth is used. In some embodiments, the VFA may record the CPU bandwidth. In other embodiments, the VFA may perform calculations to check how compressible the data is. In further embodiments, the analyzer may compress IOs arriving to it to get an accurate compression ratio for incoming data. In at least one embodiment, the analyzer may compress just a sample of the IOs in order to get an approximate compression IO. In certain embodiments, the analyzer may try multiple compression algorithms in order to find CPU to bandwidth option.

In some embodiments, the user may notify the collector which virtual machines are to be replicated and with what SLA each VM should be replicated. In other embodiments, the collector may determine which VMs need replication and what SLA each VM requires based on the virtual machines storage profiles. In some embodiments, the collector may make recommendations to the user regarding the amount of resources needed for replication e.g. WAN, CPU, hypervisor count memory amount.

In certain embodiments, the collector may run in an environment being replicated and may change the system configuration and spawn more resources based on information collected. In at least one embodiment, the analysis filter may run as part of a splitter. In alternative embodiments, the analysis filter may determine based on the calculations done by the VFAs and how many DPAs or vDPAs would be necessary to replicate the data. In further embodiments, the analysis filter may determine the amount of bandwidth needed. In at least one embodiment, the analysis filter may determine the amount of CPU each DPA requires. In still further embodiments, the analysis filter may determine the compression algorithms to be used in order to achieve desired replication properties.

Asymmetric Active/Active Replication

In certain embodiments, it may be enabled to provide active active access to a VVOL in two different locations, i.e. the VVOL may be accessed at both sites at the same time. In at least one embodiment, this may require cache coherency. In certain embodiments, the metadata volume which may be the virtual volume containing the virtual machine configuration information may need to be accessible at both sites. In a first embodiment, access to the VVO1 may be enabled at the replication site and the IOs (both reads and writes) to the VVO1 on the replication site may be redirected synchronously to the production site. In further embodiments, the data generated at the production site and data generated at the replica site may be replicated asynchronously or synchronously to the replication site.

Figure 48:
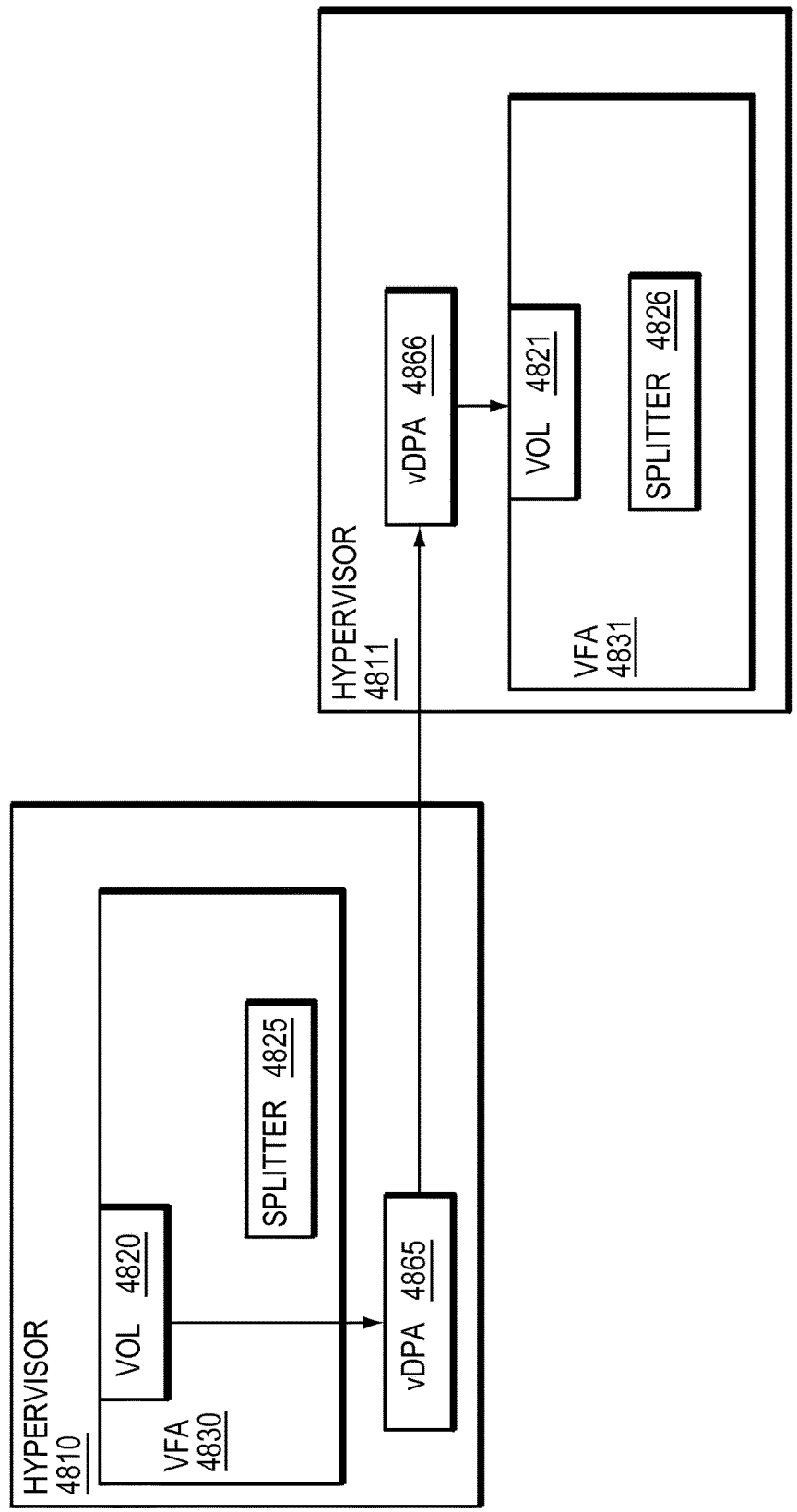
FIG. 48 is a simplified illustration of exposing a replication image on a replication site while still using the replication image to replicate data from a production site, in accordance with an embodiment of the present disclosure.
Figure 49:
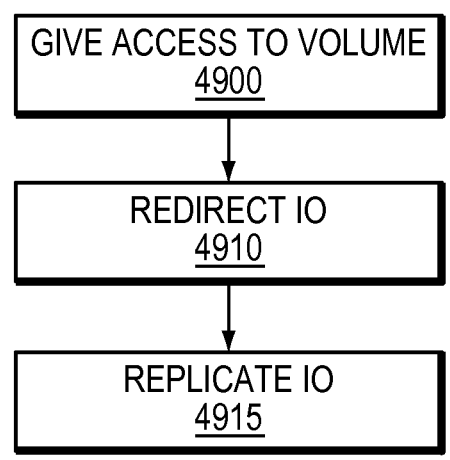
FIG. 49 is a simplified example of a method to enable exposing a replication image on a replication site while still using the replication image to replicate data from a production site, in accordance with an embodiment of the present disclosure.

Refer now to the example embodiments of FIGS. 48 and 49. In FIG. 48, hypervisor 4810 is a production site replicating volume 4820 on VFA 4830 through vDPA 4865 to Volume 4821 on VFA 4831 through vDPA 4866 on hypervisor 4811, where hypervisor 4811 is functioning as a replication site. Access is given to volume 4821 on hypervisor 4811 (step 4900), the volume is exposed with the same VVOL identity as volume 4820 at the production site. The volumes 4820 and 4821 may need to be consistent or stale information may be read on one of the volumes. Any IO directed to volume 4821 is re-directed by the splitter 4826 to volume 4820. IO arriving to volume 4820 is intercepted by splitter running on VFA 4830 and replicated to volume 4821 (step 4915). In certain embodiments, the IO which was redirected to volume 4821 to volume 4820 need not be resent back to volume 4821, from the production site as a cache of this data may be kept to be applied during the replication from 4820 to 4821.

Figure 50:
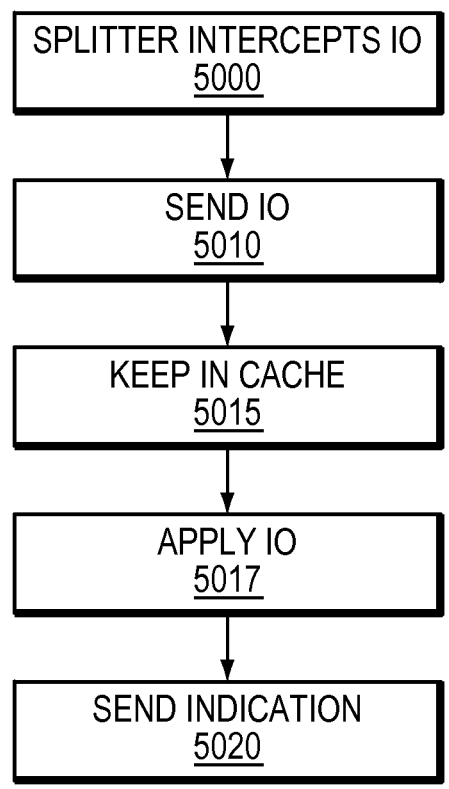
FIG. 50 is a simplified example of a method to cache writes to an exposed replication image on a replication site, in accordance with an embodiment of the present disclosure.

Refer now as well to the example embodiment of FIG. 50. Following an arrival of an IO to volume 4821, Splitter 4826 intercepts IOs (both reads and writes) and send IO to vDPA 4866 (Step 5000). vDPA 4866 send IO to vDPA 4865 (step 5010). vDPA 4866 keeps to IO in cache write IOs (step 5015). vDPA 4865 applies IOs to volume 4820 (step 5017). Splitter 4825 at VFA 4830 does not split IOs that arrived from splitter 4866 through vDPA 4865, since replica site already has the data for them, and splitter sends an indication using a command, such as a vendor specific SCSCI command, to indicate the order of the IOs which arrived from vDPA 4865 (step 5020).

Figure 51:
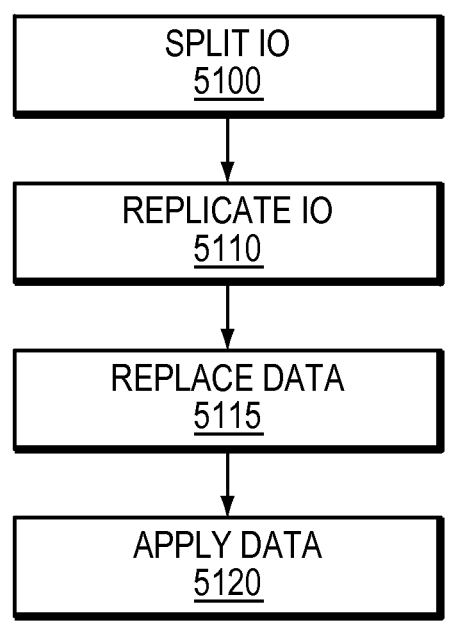
FIG. 51 is a simplified example of a method to maintain IO order for an exposed replication image on a replication site, in accordance with an embodiment of the present disclosure.

Refer now as well to the example embodiment of FIG. 51. For IOs arriving from hosts other than vDPA 4865, splitter 4825 splits the IOs to vDPA 4865, to maintain the ordering between IOs from replica site and IOs from production site (step 5100). vDPA replicate IOs arriving from the splitter and indications of IOs which arrive from the replica site to vDPA 4866 (step 5110) When an indication of an IO arrives from the production site, vDPA replaces it with the data cached at vDPA 4866, to allow the replica journal have the data from both production and replica site (step 5115). Data is applied to the journal and from the journal to replica volume 4821 (step 5120).

Remote Storage Motion:

In some embodiments, vmotion may move the virtual machine to run on another hypervisor. In further embodiments, remote vmotion may move a virtual machine to another site where both the hypervsor and the storage are different.

Figure 52:
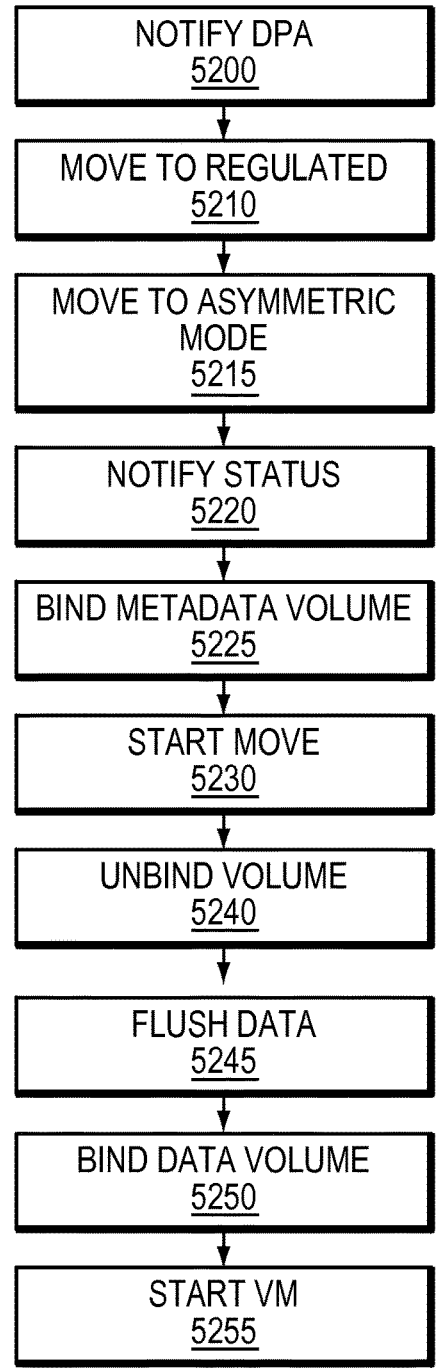
FIG. 52 is a simplified example of a method for performing remote remote storage motion, in accordance with an embodiment of the present disclosure.
Figure 53:
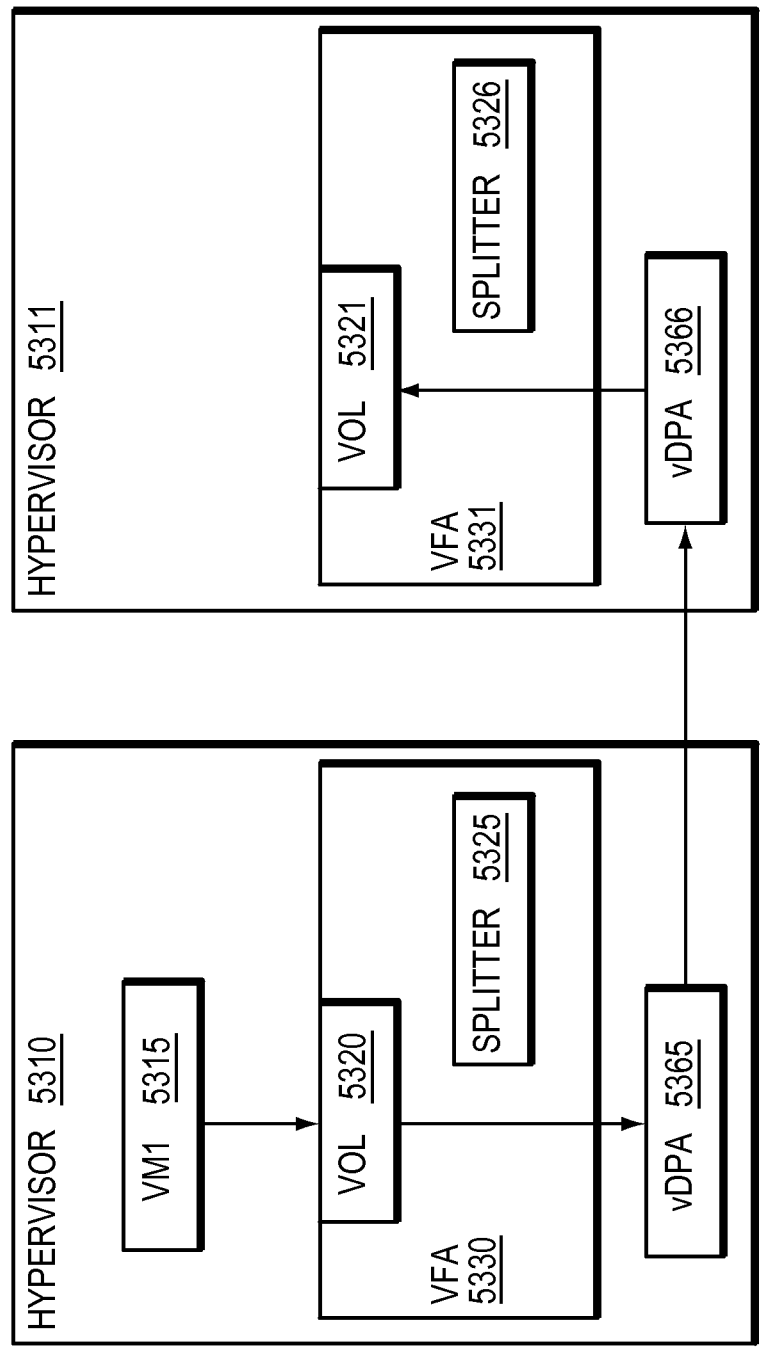
FIG. 53 is a simplified illustration of a virtual machine before remote storage motion, in accordance with an embodiment of the present disclosure.
Figure 54:
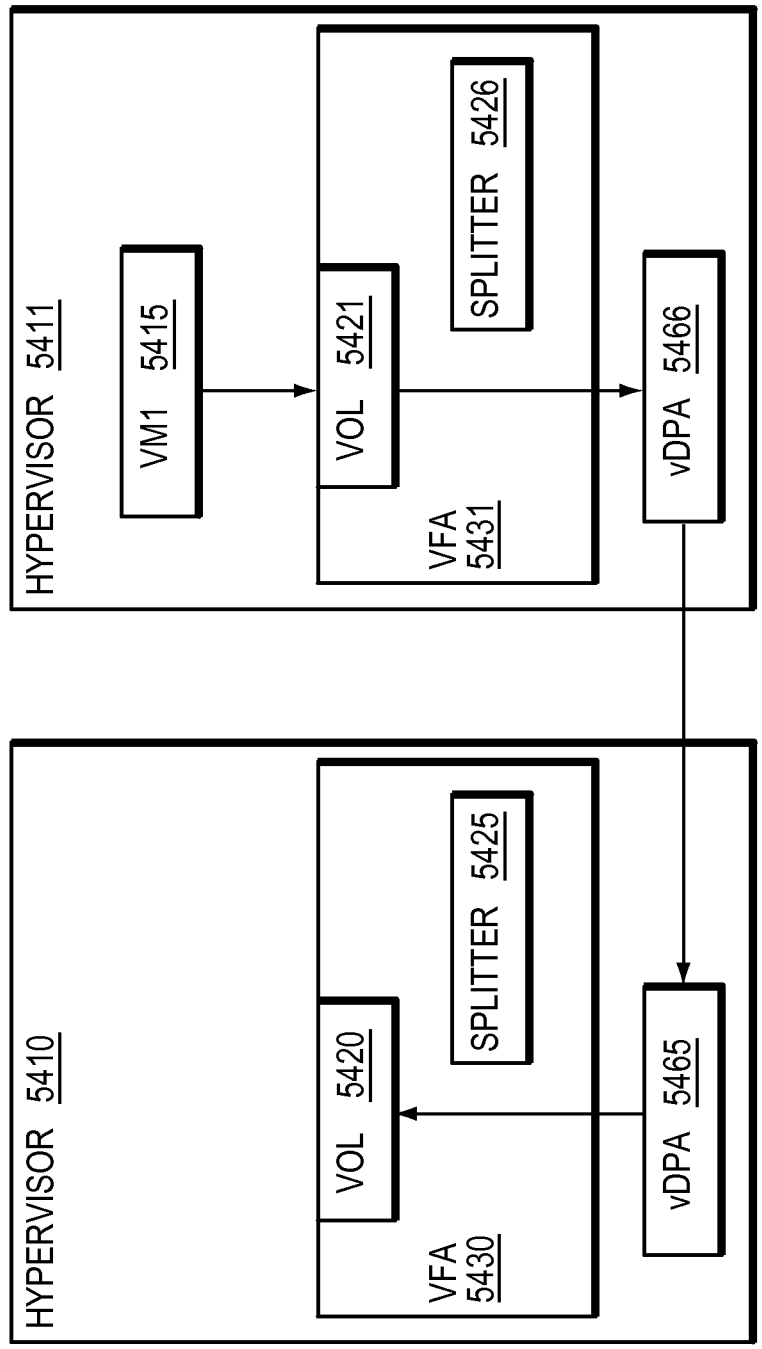
FIG. 54 is a simplified illustration of a virtual machine after remote storage motion, in accordance with an embodiment of the present disclosure.
Figure 55:
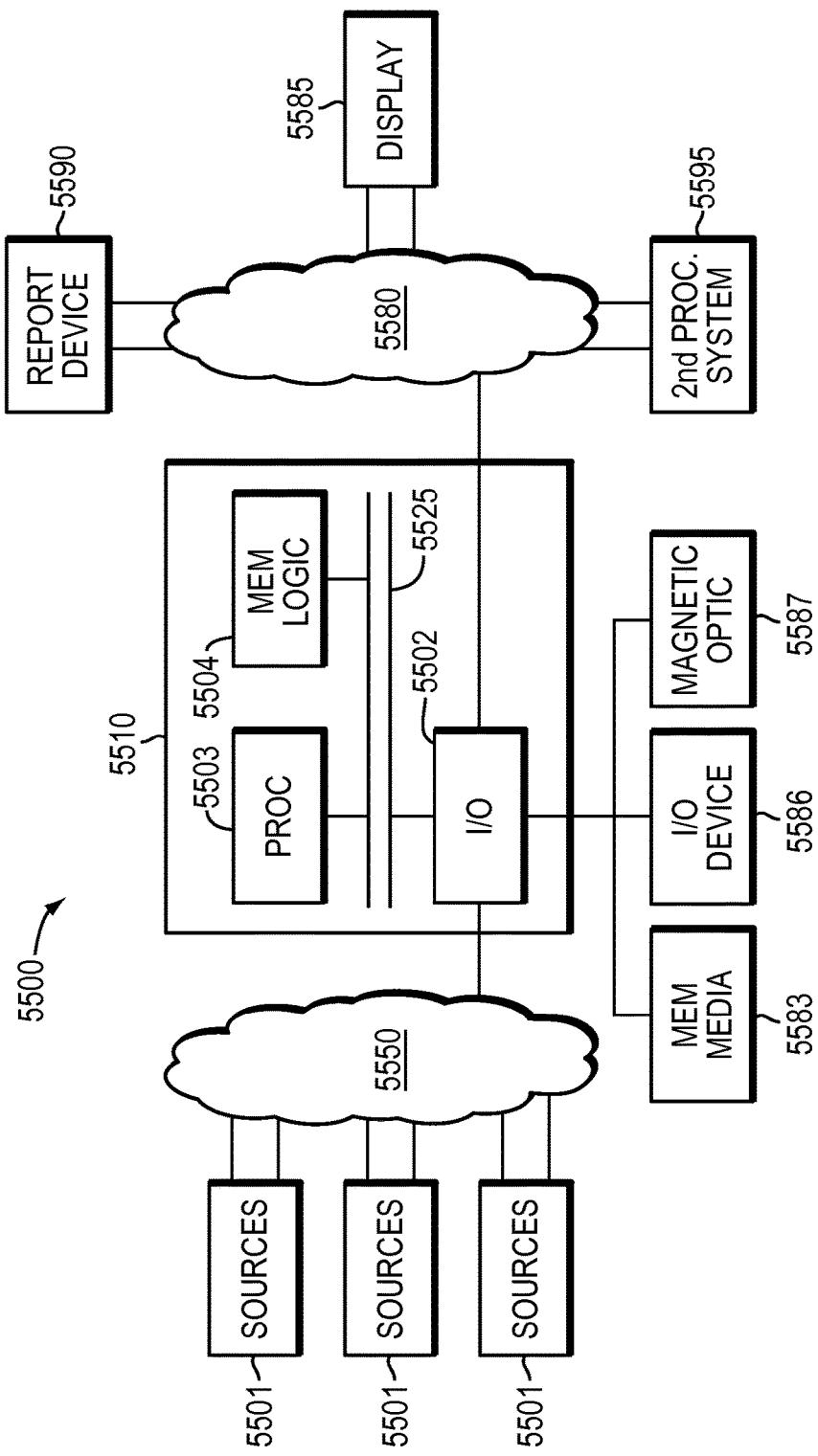
FIG. 55 is an example of an embodiment of an apparatus that may utilize the techniques described herein, in accordance with an embodiment of the present disclosure.
Figure 56:
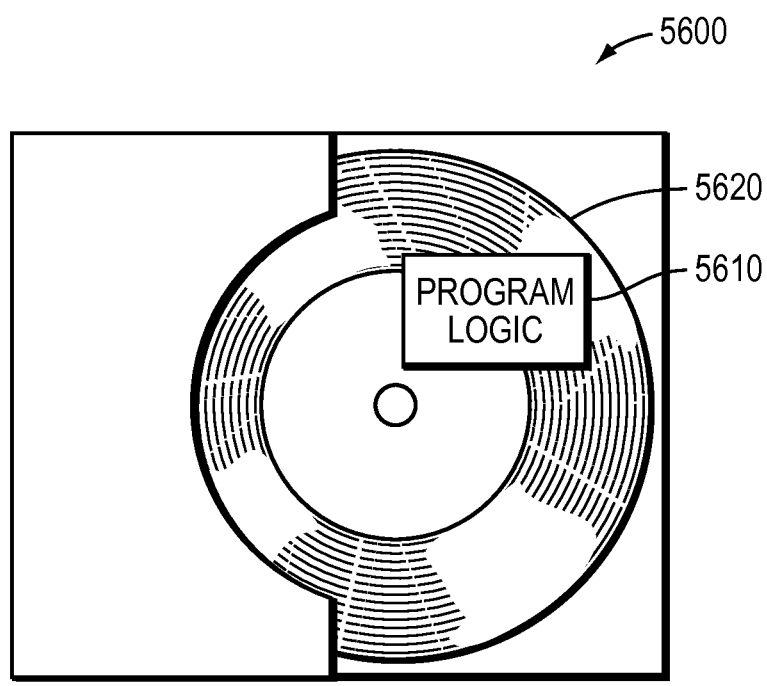
FIG. 56 is an example of a method embodied on a computer readable storage medium that may utilize the techniques described herein, in accordance with an embodiment of the present disclosure.

In an embodiment, virtual machine live migration, such as vmotion, may enable a VM running on production site to move to a replica site. Refer now to the example embodiments of FIGS. 52, 53, and 54. FIG. 52 represents a sample method for performing remote vmotion, FIG. 53 represents a VM before vmotion, and FIG. 54 represents the VM after vMotion. In the example of FIGS. 53 and 54, hypervisors 5410 and 5411 may run on different sites which are distant from each other; the sites may be at synchronous distance (i.e. up to 50 miles a part) or an asynchronous distance An API, such as VMWare VASA prepareBindVirtualVolume, notifies replication appliance 5365 that a volume move is to occur for a Virtual Machine 5315 (VM) (step 5200). Replication appliance 5365 moves the consistency to regulated mode and reduces the journal lag and the lag between production 5310 and replica site 5311 by delaying acknowledgment of IOs and thus reducing the IO bandwidth, enabling a failover to take a short period of time (step 5210).

The replication appliance moves metadata volume to be asymmetric synchronous replication mode (step 5215). Replication appliance 5365 notifies the API it is ready for the storage motion (step 5220) i.e. prepare bind is complete. The API binds metadata volume at replica 5311; replication appliance 5365 redirects the IOs from remote 5311 to production site 5310 (step 5225). The vmotion process starts moving the machine memory of VM 5315 to the remote site 5311 (step 5230). The VASA API unbinds the volume from the production VM 5311 (step 5240). Replication appliance 54115 flushes the data from the production site 5410 and mounts the latest point in time at the replica 5411 (step 5245) replication allows access to the replica volume directly from the replica site without redirecting the IO to the old production site. The API binds data volume at replica 5411 and the replication appliance binds when the data reaches replica site 5411 (step 5250). Virtual machine 5415 starts running at replica 5411 (step S255). In another embodiment, the replication from the production site may move to synchronous replication before step 5220, and there the flushing the data at step 5245 may not occur. In most embodiments, the production site may dictate the order of the replication on the replication site, regardless of whether the information is sent from the production site or cached on the replication site.

In certain embodiments, there may be a virtualization layer for each group of virtual machines forming a tenant. In some embodiments, each tenant may replicate to a different replication appliance.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 11, the machine becomes an apparatus for practicing the invention. When implemented on one or more general-purpose processors, the program code combines with such a processor 1103 to provide a unique apparatus that operates analogously to specific logic circuits. As such a general purpose digital machine can be transformed into a special purpose digital machine. FIG. 12 shows Program Logic 1234 embodied on a computer-readable medium 1230 as shown, and wherein the Logic is encoded in computer-executable code configured for carrying out the reservation service process of this invention and thereby forming a Computer Program Product 1200. The logic 1234 may be the same logic 1140 on memory 1104 loaded on processor 1103. The program logic may also be embodied in software modules, as modules, or as hardware modules.

The logic for carrying out the method may be embodied as part of the system described below, which is useful for carrying out a method described with reference to embodiments shown in, for example, FIG. 5, FIG. 7 and FIG. 10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system for data replication, the system comprising:
    a hypervisor having a virtualization layer; wherein the virtualization layer runs in the hypervisor; wherein the virtualization layer consumes storage;
    a splitter running in the virtualization layer;
    a storage entity corresponding to a virtual disk; wherein the virtual disk is exposed by the virtualization layer to one or more virtual machines running in the hypervisor; wherein the virtual disk is mapped to a portion of the consumed storage; and
    memory; one or more processors; computer-executable program logic, stored in one or more portions of the memory, wherein the computer-executable program logic, executed by the one or more processors to perform:
    exposing, via the virtualization layer, the storage entity;
    splitting IO in the splitter in the virtualization layer; wherein the splitting includes the splitter intercepting IO directed to the virtual disk and creating a copy of the IO sent to the virtual disk.

2. The system of claim 1 wherein the computer logic is further configured for the execution of:
    journaling IO from the splitter in a journal; the journal including do data and undo; wherein the do data is data to be applied to an image and wherein undo data is data to undo IOs that have been applied to the image;
    providing access to any point in time access for the image by applying the do data or undo data to roll the image to another point in time.

3. The system of claim 1 wherein the computer logic is further configured for the execution of:
    sending the copy of the IO from the splitter to a data replication appliance.

4. The system of claim 3 wherein consistency groups use the splitter to send IO the data protection appliance running a consistency group; wherein there are one or more storage entities for each consistency group of the consistency groups.

5. The system of claim 4 wherein the computer logic is further configured for the execution of:
    quiescing IO to establish a consistent point in time;
    taking a bookmark of the images for each of the consistency groups;
    unquiescing the IO.

6. The system of claim 3 wherein the computer logic is further configured for the execution of:
    providing to the data replication appliance access to the storage entity through communicating with a replication splitter.

7. A computer implemented method comprising:
    exposing, via a virtualization layer, a storage entity; wherein the virtualization layer runs in a hypervisor; wherein the virtualization layer consumes storage; and wherein the storage entity corresponds to a virtual disk; wherein the virtual disk is exposed by the virtualization layer to one or more virtual machines running in the hypervisor; wherein the virtual disk is mapped to a portion of the consumed storage;
    splitting IO in the splitter running in the virtualization layer; wherein the splitter runs in the virtualization layer and the splitting intercepts IO directed to the virtual disk and creates a copy of the IO sent to the virtual disk.

8. The computer implemented method of claim 7 wherein the storage entity is a VVOL and has a VASA control path.

9. The computer implemented method of claim 7 wherein the storage entity is a file in a network file system.

10. The computer implemented method of claim 7 further comprising:
    sending the copy of the IO from the splitter to a data replication appliance.

11. The computer implemented method of claim 10 wherein consistency groups use the splitter to send IO the data protection appliance running a consistency group; wherein there are one or more storage entities for each consistency group of the consistency groups.

12. The computer implemented method of claim 7 further comprising:
    journaling IO from the splitter in a journal; the journal including do data and undo; wherein the do data is data to be applied to an image and wherein undo data is data to undo IOs that have been applied to the image;
    providing access to any point in time access for the image by applying the do data or undo data to roll the image to another point in time.

13. The computer implemented method of claim 12 wherein the journal contains metadata; wherein application of the metadata rolls the image to a point in time which is application consistent.

14. A computer program product for use in replication comprising:
    a non-transitory computer readable medium encoded with computer executable program code for replication of data, the program code executed by one or more processors or on portions of one or more processors, the code configured for execution of:
    exposing, via a virtualization layer, a storage entity; wherein the virtualization layer runs in a hypervisor; wherein the virtualization layer consumes storage; and wherein the storage entity corresponds to a virtual disk; wherein the virtual disk is exposed by the virtualization layer to one or more virtual machines running in the hypervisor; wherein the virtual disk is mapped to a portion of the consumed storage;

splitting IO in a splitter running in the virtualization layer; wherein the splitter runs in the virtualization layer and the splitting intercepts IO directed to the virtual disk and creates a copy of the IO sent to the virtual disk.

15. The computer program product of claim 14 wherein the storage entity is a VVOL and has a VASA control path.

16. The computer program product of claim 14 wherein the storage entity is a file in a network file system.

17. The computer program product of claim 14 the code further configured for execution of:

sending the copy of the IO from the splitter to a data replication appliance.

18. The computer program product of claim 17 wherein consistency groups use the splitter to send IO the data protection appliance running a consistency group; wherein there are one or more storage entities for each consistency group of the consistency groups.

19. The computer program product of claim 18 the code further configured for execution of:

quiescing IO to establish a consistent point in time;

taking a bookmark of the images for each of the consistency groups;

unquiescing the IO.

20. The computer program product of claim 14 the code further configured for execution of:

journaling IO from the splitter in a journal; the journal including do data and undo; wherein the do data is data to be applied to an image and wherein undo data is data to undo IOs that have been applied to the image;

providing access to any point in time access for the image by applying the do data or undo data to roll the image to another point in time.

21. The computer program product of claim 20 wherein the journal contains metadata; wherein application of the metadata rolls the image to a point in time which is application consistent.

22. The computer program product of claim 20 the code further configured for execution of:

providing to the data replication appliance access to the storage entity through communicating with a replication splitter.

\* \* \* \* \*